United States Patent
Kinjo et al.

(10) Patent No.: US 11,973,448 B2
(45) Date of Patent: Apr. 30, 2024

(54) DRIVE DEVICE FOR ROTARY ELECTRIC MACHINE

(71) Applicant: DENSO CORPORATION, Kariya (JP)

(72) Inventors: Hirofumi Kinjo, Nisshin (JP); Takashi Kashiwazaki, Nisshin (JP); Makoto Taniguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 449 days.

(21) Appl. No.: 17/212,655

(22) Filed: Mar. 25, 2021

(65) Prior Publication Data

US 2021/0211084 A1 Jul. 8, 2021

Related U.S. Application Data

(63) Continuation of application No. PCT/JP2019/029468, filed on Jul. 26, 2019.

(30) Foreign Application Priority Data

Sep. 25, 2018 (JP) .................. 2018-179051

(51) Int. Cl.
*H02M 7/493* (2007.01)
*H02M 1/08* (2006.01)
(Continued)

(52) U.S. Cl.
CPC .............. *H02P 27/08* (2013.01); *H02M 1/08* (2013.01); *H02M 7/53871* (2013.01)

(58) Field of Classification Search
CPC ...... H02P 27/08; H02M 1/08; H02M 7/53871; H02M 7/493
(Continued)

(56) References Cited

U.S. PATENT DOCUMENTS

2007/0278986 A1 12/2007 Okamura
2009/0128076 A1* 5/2009 Taniguchi .............. H02P 25/22
318/400.41
(Continued)

FOREIGN PATENT DOCUMENTS

JP 2007-325351 A 12/2007
JP 2008-219956 A 9/2008
(Continued)

*Primary Examiner* — Kawing Chan
*Assistant Examiner* — Gabriel Agared
(74) *Attorney, Agent, or Firm* — Oliff PLC

(57) ABSTRACT

A drive device for a rotary electric machine includes a first inverter that has high-potential side and low-potential side switching elements corresponding to phases of the rotary electric machine and is connected to a DC power supply, a second inverter that has high-potential side and low-potential side switching elements corresponding to the phases and is connected to the first inverter via a connection line, and a controller that controls the first and second inverters so that if a percentage modulation expressed by a fundamental wave component amplitude of a phase winding voltage and a DC voltage is a threshold value or more, percentage modulations of output phase voltages of the first and second inverters are more than 1, and so that a phase difference between a phase of the output phase voltage of the first inverter section and that of the second inverter section changes depending on the percentage modulation.

5 Claims, 28 Drawing Sheets

(51) Int. Cl.
*H02M 7/5387* (2007.01)
*H02P 27/08* (2006.01)

(58) Field of Classification Search
USPC .......................................... 318/504
See application file for complete search history.

(56) References Cited

U.S. PATENT DOCUMENTS

| | | | | |
|---|---|---|---|---|
| 2010/0289372 | A1* | 11/2010 | Taniguchi | H02K 3/28 |
| | | | | 310/195 |
| 2010/0320945 | A1* | 12/2010 | Taniguchi | H02P 23/08 |
| | | | | 318/400.23 |
| 2016/0141977 | A1* | 5/2016 | Oka | H02M 7/49 |
| | | | | 318/504 |
| 2016/0352269 | A1* | 12/2016 | Takahashi | H02P 27/085 |

FOREIGN PATENT DOCUMENTS

| | | |
|---|---|---|
| JP | 2010-220431 A | 9/2010 |
| JP | 2010-279113 A | 12/2010 |
| JP | 2017-175747 A | 9/2017 |

* cited by examiner

DRIVE DEVICE FOR ROTARY ELECTRIC MACHINE

CROSS-REFERENCE TO RELATED APPLICATION

This application is based on and claims the benefit of priority from earlier Japanese Patent Application No. 2018-179051 filed Sep. 25, 2018, the description of which is incorporated herein by reference.

BACKGROUND

Technical Field

The present disclosure relates to a drive device for a rotary electric machine.

Related Art

A configuration is disclosed in which two inverters are connected to a motor generator with open windings and a switch is provided between the inverters.

SUMMARY

As an aspect of the present disclosure, a drive device for a rotary electric machine is provided. The drive device includes: a first inverter section that includes first high-potential side switching elements and first low-potential side switching elements, the first high-potential side switching elements corresponding to respective phases of the rotary electric machine including multiphase windings and opening and closing a part between a first high potential point and one end of the corresponding winding, the first low-potential side switching elements corresponding to the respective phases of the rotary electric machine and opening and closing a part between one end of the corresponding winding and a first low potential point, the first high potential point being connected to a positive electrode of a DC power supply section, the first low potential point being connected the a negative electrode of the DC power supply section; a second inverter section that includes second high-potential side switching elements and second low-potential side switching elements, the second high-potential side switching elements corresponding to the respective phased of the rotary electric machine and opening and closing a part between a second high potential point and the other end of the corresponding winding, the second low-potential side switching elements corresponding to the respective phases of the rotary electric machine and opening and closing a part between the other end of the corresponding winding and a second low potential point, the second high potential point being connected to the first high potential point via a first connection line, the second low potential point being connected to the first low potential point via a second connection line; and a control section that controls the first inverter section and the second inverter section to drive the rotary electric machine so that if a percentage of modulation $\alpha$ expressed by a fundamental wave component amplitude of a phase winding voltage and a DC voltage of the DC power supply section is a threshold value $\alpha$th or more, a percentage of modulations $\alpha_1$ of the first inverter section expressed by a fundamental wave component amplitude of an output phase voltage of the first inverter section and a DC voltage of the DC power supply section and a percentage of modulations $\alpha_2$ of the second inverter section expressed by a fundamental wave component amplitude of an output phase voltage of the second inverter section and a DC voltage of the DC power supply section is more than 1, and so that a phase difference $\Delta\theta$ $(=\theta_2-\theta_1)$ between a phase $\theta_1$ of the output phase voltage of the first inverter section and a phase $\theta_2$ of the output phase voltage of the second inverter section changes depending on the percentage of modulation $\alpha$.

DETAILED DESCRIPTION OF THE PREFERRED EMBODIMENTS

JP 2017-175747 A discloses a configuration in which two inverters are connected to a motor generator with open windings and a switch is provided between the inverters. According to this configuration, the switch is opened within a low to mid speed rotation range to set the winding of the motor generator to a Y-connection state to drive the motor generator. The switch is closed within a mid to high speed rotation range to perform H-bridge driving in which voltage is applied to each phase by PWM (Pulse Width Modulation) control.

JP 2010-220431 A discloses a technique in which a boost converter is provided between a battery and an inverter and voltage is adjusted by the boost converter to perform drive over a wide rotation range by rectangular wave control.

According to the technique disclosed in JP 2017-175747 A, PWM control is performed within a mid to high speed rotation range of the motor generator. However, switching elements of the inverter are turned on and off with high frequency specifically in a mid speed rotation range in which enough voltage is applied. Hence, switching loss is large. According to the technique disclosed in JP 2010-220431 A, switching loss can be reduced by performing rectangular wave control. However, using a boost converter increases the drive device in size.

The present disclosure provides a drive device for a rotary electric machine, the drive device being able to reduce switching loss of an inverter without increasing the drive device in size.

Hereinafter, embodiments of the present disclosure will be described with reference to the drawings.

First Embodiment

Figure 1:
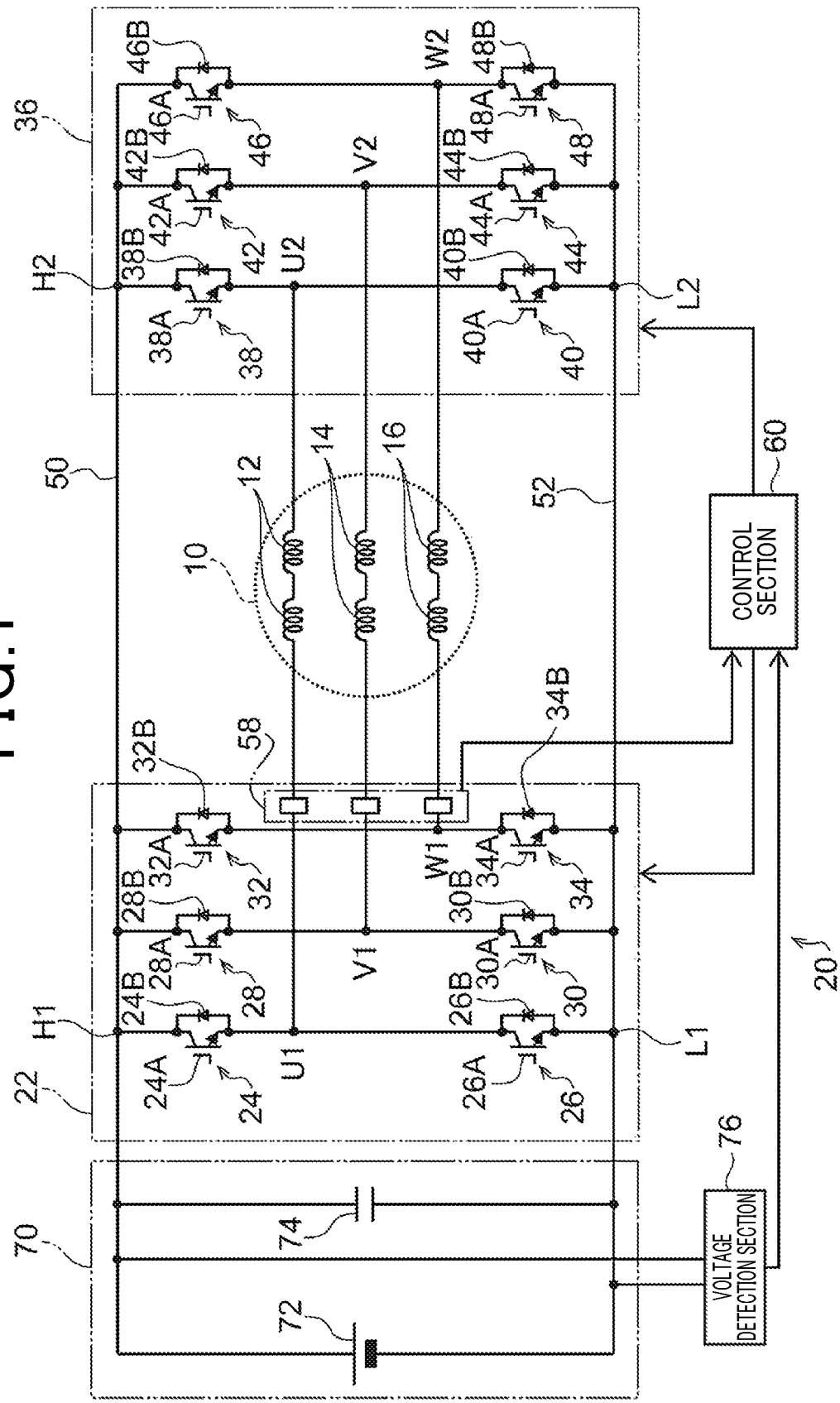
FIG. 1 is a schematic diagram of a drive device for a rotary electric machine according to a first embodiment.

FIG. 1 shows a motor generator 10, which is an example of a rotary electric machine, a drive unit (drive device) 20 that drives the motor generator 10, and a DC power supply section 70 that supplies DC power to the drive unit 20. The drive unit 20 is an example of a drive device for a rotary electric machine.

The motor generator 10 is a so-called traction unit motor, which is installed in an electrically driven vehicle such as an electric vehicle or a hybrid vehicle, and generates torque for driving drive wheels, not shown, of the electrically driven vehicle. The motor generator 10 function as a motor driven by the drive unit 20 or a generator driven by drive force transmitted from the drive wheels or an engine, not shown, of the electrically driven vehicle to generate electric power. In the present embodiment, a case in which the motor generator 10 functions as a motor will be mainly described.

The motor generator 10 is a three-phase rotary electric machine with open windings and has a U-phase coil 12, a V-phase coil 14, and a W-phase coil 16. Hereinafter, the U-phase coil 12, the V-phase coil 14 and the W-phase coil 16 are appropriately referred as coils 12 to 16. A current flowing through the U-phase coil 12 is referred to as a U-phase current iu, a current flowing through the V-phase coil 14 is referred to as a V-phase current iv, and a current flowing through the W-phase coil 16 is referred to as a W-phase current iw. Regarding the currents flowing through the coils 12 to 16, the current flowing from a first inverter section 22 to a second inverter section 36 is defined as a positive current, and the current flowing from the second inverter section 36 to the first inverter section 22 is defined as a negative current.

The phase currents iu, iv, iw of the motor generator 10 are detected by a current detection section 58 including current detection elements such as Hall elements for respective phases. A rotation electric angle θ of the output shaft of the motor generator 10 is detected by a rotation angle sensor, not shown.

The drive unit 20 includes the first inverter section 22, the second inverter section 36, a high-potential side connection line 50, a low-potential side connection line 52, and a control section 60.

The first inverter section 22 is a three-phase inverter that switches currents flowing to the coils 12 to 16. The first inverter section 22 corresponds to the coil 12, and includes a switching element 24 provided between a first high potential point H1 and a connection point U1 of the first inverter section 22 and a switching element 26 provided between the connection point U1 and a first low potential point L1 of the first inverter section 22. In addition, the first inverter section 22 corresponds to the coil 14, and includes a switching element 28 provided between the first high potential point H1 and a connection point V1 and a switching element 30 provided between one end of the coil 14 and the connection point V1. Furthermore, the first inverter section 22 corresponds to the coil 16, and includes a switching element 32 provided between the first high potential point H1 and a connection point W1, and a switching element 34 provided between the connection point W1 and the first low potential point L1.

In the first inverter section 22, each of the switching elements 24, 28, 32 is an example of a first high-potential side switching element and is appropriately referred to as a first high-potential side switching element. Each of the switching elements 26, 30, 34 is an example of a first low-potential side switching element and is appropriately referred to as a first low-potential side switching element.

The second inverter section 36 is also a three-phase inverter that switches currents flowing to the coils 12 to 16. The second inverter section 36 corresponds to the coil 12, and includes a switching element 38 provided between a second high potential point H2 and a connection point U2 of the second inverter section 36, and a switching element 40 provided between the connection point U2 and a second low potential point L2 of the second inverter section 36. In addition, the second inverter section 36 corresponds to the coil 14, and includes a switching element 42 provided between the second high potential point H2 and a connection point V2, and a switching element 44 provided between the connection point V2 and the second low potential point L2. Furthermore, the second inverter section 36 corresponds to the coil 16, and includes a switching element 46 provided between the second high potential point H2 and a connection point W2, and a switching element 48 provided between the connection point W2 and the second low potential point L2.

In the second inverter section 36, each of the switching elements 38, 42, 46 is an example of a second high-potential side switching element and is appropriately referred to as a second high-potential side switching element. Each of the switching elements 40, 44, 48 is an example of a second low-potential side switching element and is appropriately referred to as a second low-potential side switching element.

The switching element 24 has a transistor 24A and a diode 24B. The switching elements 26 to 34, 38 to 48 also respectively have transistors 26A to 34A, 38A to 48A and diodes 26B to 34B, 38B to 48B.

Each of the transistors 24A to 34A, 38A to 48A is an IGBT (insulated gate bipolar transistor) and is turned on and off by the control section 60. When the transistors 24A to 34A, 38A to 48A are turned on, electric conduction from the high-potential side to the low-potential side is allowed. When the transistors 24A to 34A, 38A to 48A are turned off, the electric conduction is interrupted. Each of the transistors 24A to 34A, 38A to 48A is not limited to an IGBT and may be a MOSFET or the like.

The diodes 24B to 34B, 38B to 48B are respectively connected to the transistors 24A to 34A, 38A to 48A in parallel, and are freewheel diodes allowing electric conduction from the low-potential side to the high-potential side. For example, the diodes 24B to 34B, 38B to 48B may be included in the transistors 24A to 34A, 38A to 48A in such a manner as a parasitic diode of a MOSFET, or may be externally mounted.

In the first inverter section 22, the connection point U1 of the U-phase switching elements 24, 26 is connected with one end of the U-phase coil 12, the connection point V1 of the V-phase switching elements 28, 30 is connected with one end of the V-phase coil 14, and the connection point W1 of the W-phase switching elements 32, 34 is connected with one end of the W-phase coil 16.

In the second inverter section 36, the connection point U2 of the U-phase switching elements 38, 40 is connected with the other end of the U-phase coil 12, the connection point V2 of the V-phase switching elements 42, 44 is connected with the other end of the V-phase coil 14, and the connection point W2 of the W-phase switching elements 46, 48 is connected with the other end of the W-phase coil 16.

The high-potential side connection line 50 connects the positive electrode of a battery 72 of the DC power supply section 70, the first high potential point H1 of the first inverter section 22, and the second high potential point H2 of the second inverter section 36. The low-potential side connection line 52 connects the negative electrode of the battery 72, the first low potential point L1 of the first inverter section 22, and the second low potential point L2 of the second inverter section 36. The high-potential side connection line 50 is an example of a first connection line, and the low-potential side connection line 52 is an example of a second connection line.

The DC power supply section 70 includes a smoothing capacitor 74 connected between the first inverter section 22 and the battery 72. DC voltage Vdc across the capacitor 74 is detected by a voltage detection section 76.

The control section 60 is connected to the first inverter section 22, the second inverter section 36, the current detection section 58, the voltage detection section 76, and a rotation angle sensor, not shown. The control section 60 includes a CPU (central processing unit), a memory, and a non-volatile storage section, and performs various arithmetic processes. The arithmetic processes of the control section 60 may be implemented by software processing in which a prestored program is executed by the CPU, or may be implemented by hardware processing by a dedicated electronic circuit.

The control section 60 controls the first inverter section 22 and the second inverter section 36. Specifically, the control section 60 generates a control signal for controlling switching on/off of the transistors 24A to 34A, 38A to 48A of the switching elements 24 to 34, 38 to 48 based on a drive command value (angular velocity command value ω* in the present embodiment) of the motor generator 10. Then, according to the generated control signal, the control section 60 generates and outputs a gate signal for controlling switching on/off of the transistors 24A to 34A, 38A to 48A. When the transistors 24A to 34A, 38A to 48A are turned on or off according to the control signal, DC power of the battery 72 is converted into AC power, which is supplied to the motor generator 10. Hence, driving the motor generator 10 is controlled by the control section 60 through the first inverter section 22 and the second inverter section 36.

Next, operation of the first embodiment will be described. In the first embodiment, the control section 60 drives the motor generator 10 by open connection control. FIGS. 2A to 2D illustrate operation in a case in which open connection control is performed for a circuit for the coil 12 (a circuit including the switching elements 24, 26, 38, 40). The open connection may be referred to as an open-end winding.

Figure 2A:
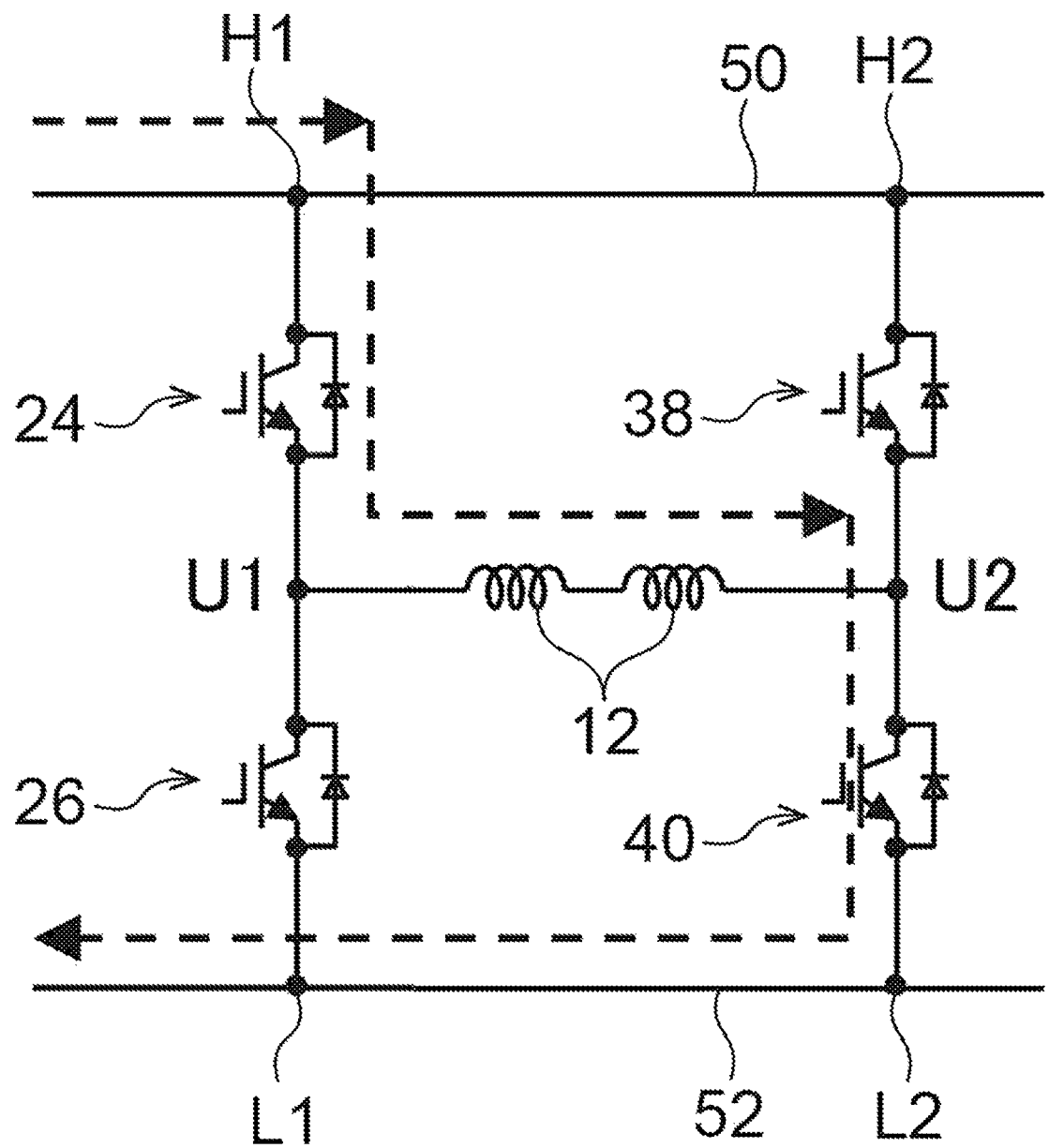
FIG. 2A is a schematic diagram illustrating operation of a circuit for a U-phase coil.
Figure 2B:
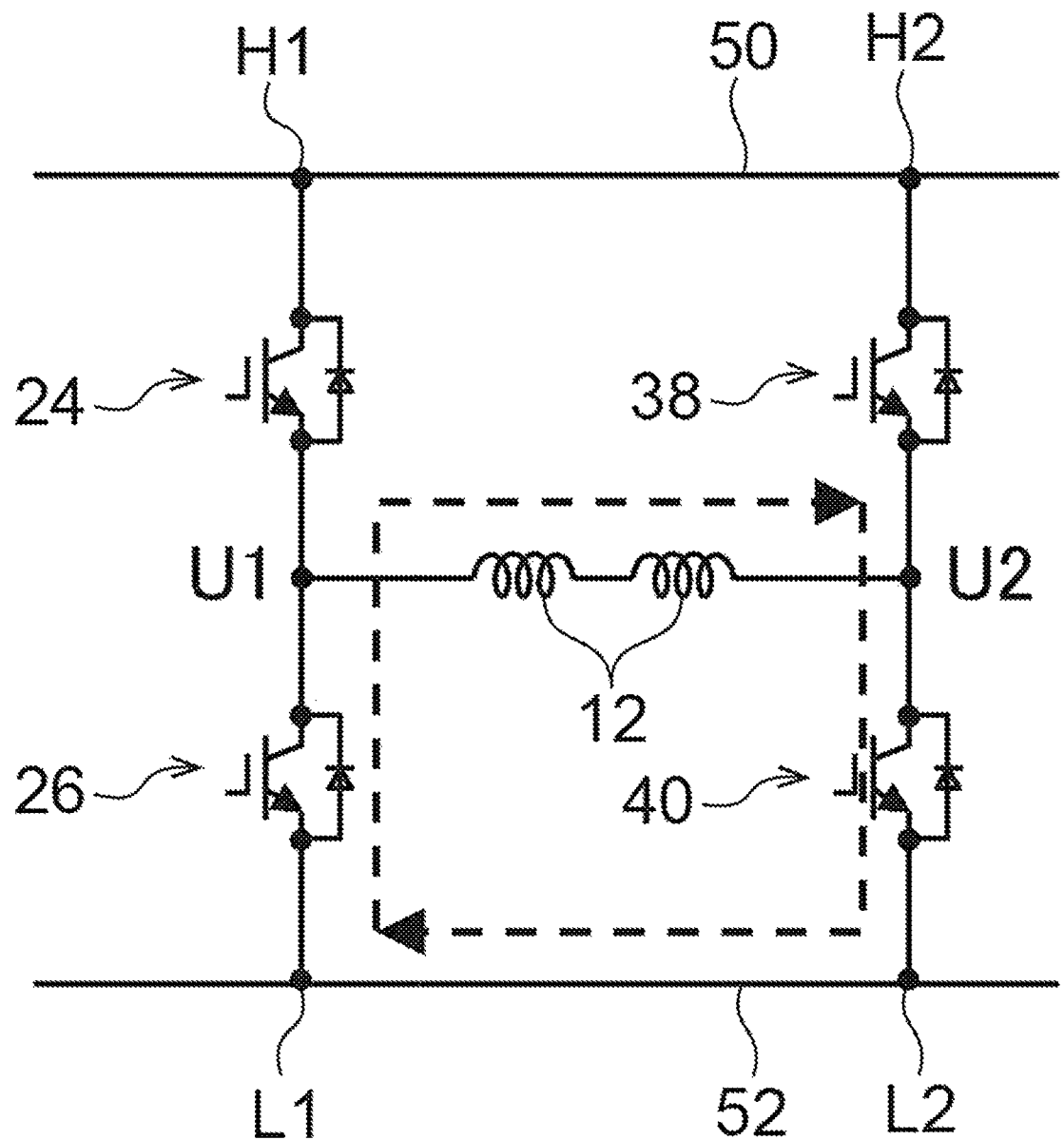
FIG. 2B is a schematic diagram illustrating operation of a circuit for a U-phase coil.
Figure 2C:
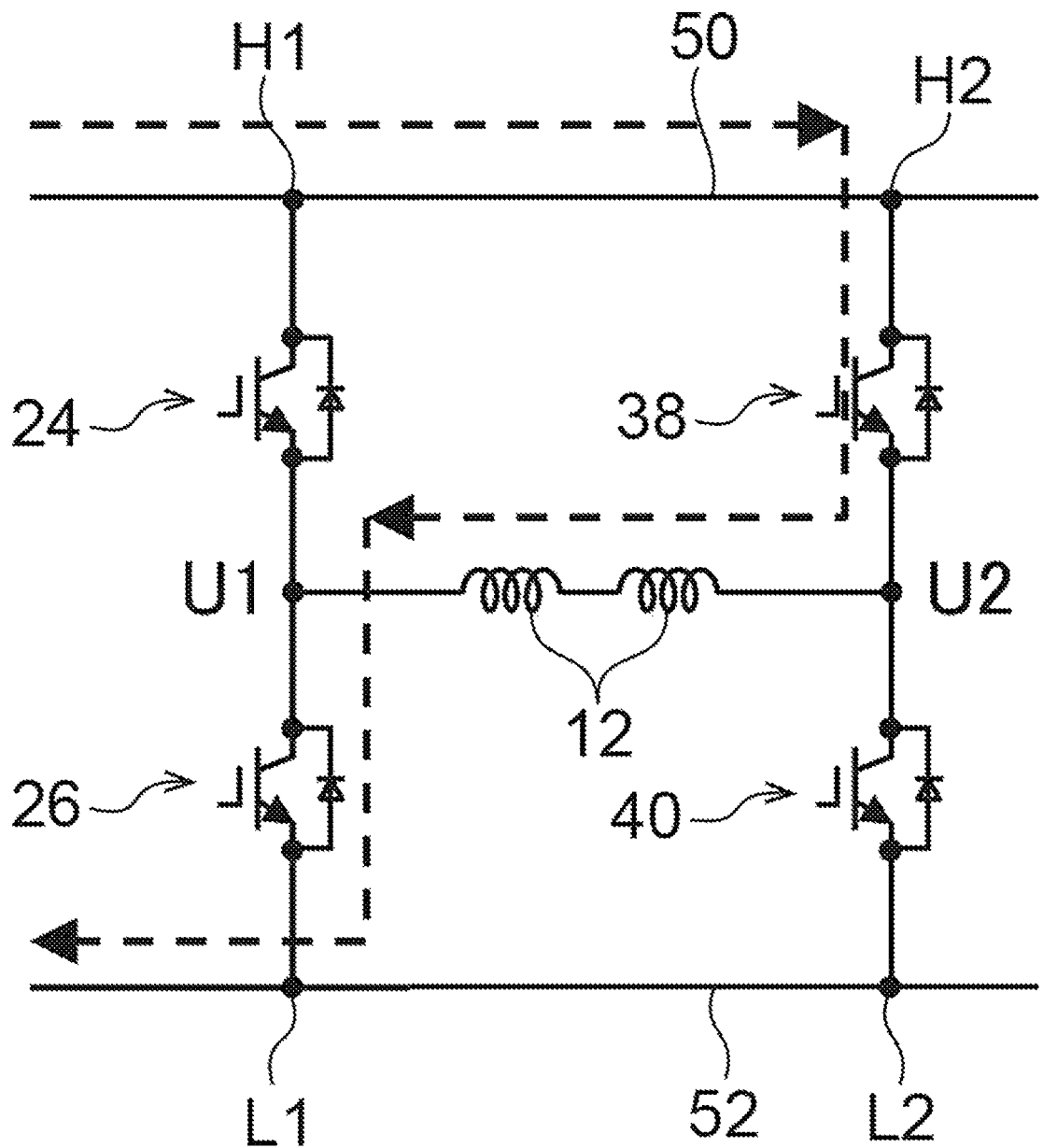
FIG. 2C is a schematic diagram illustrating operation of a circuit for a U-phase coil.
Figure 2D:
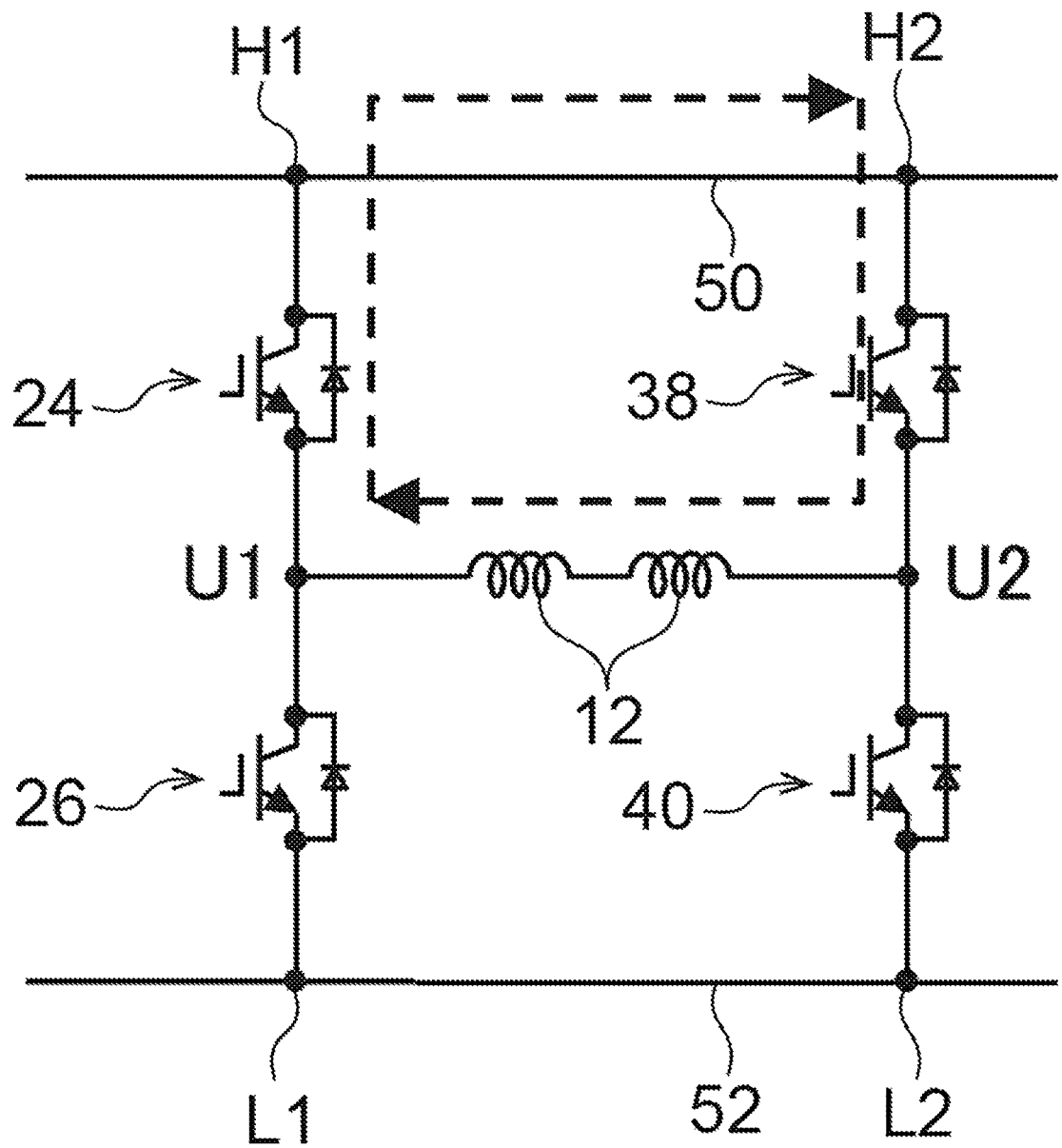
FIG. 2D is a schematic diagram illustrating operation of a circuit for a U-phase coil.
Figure 3:
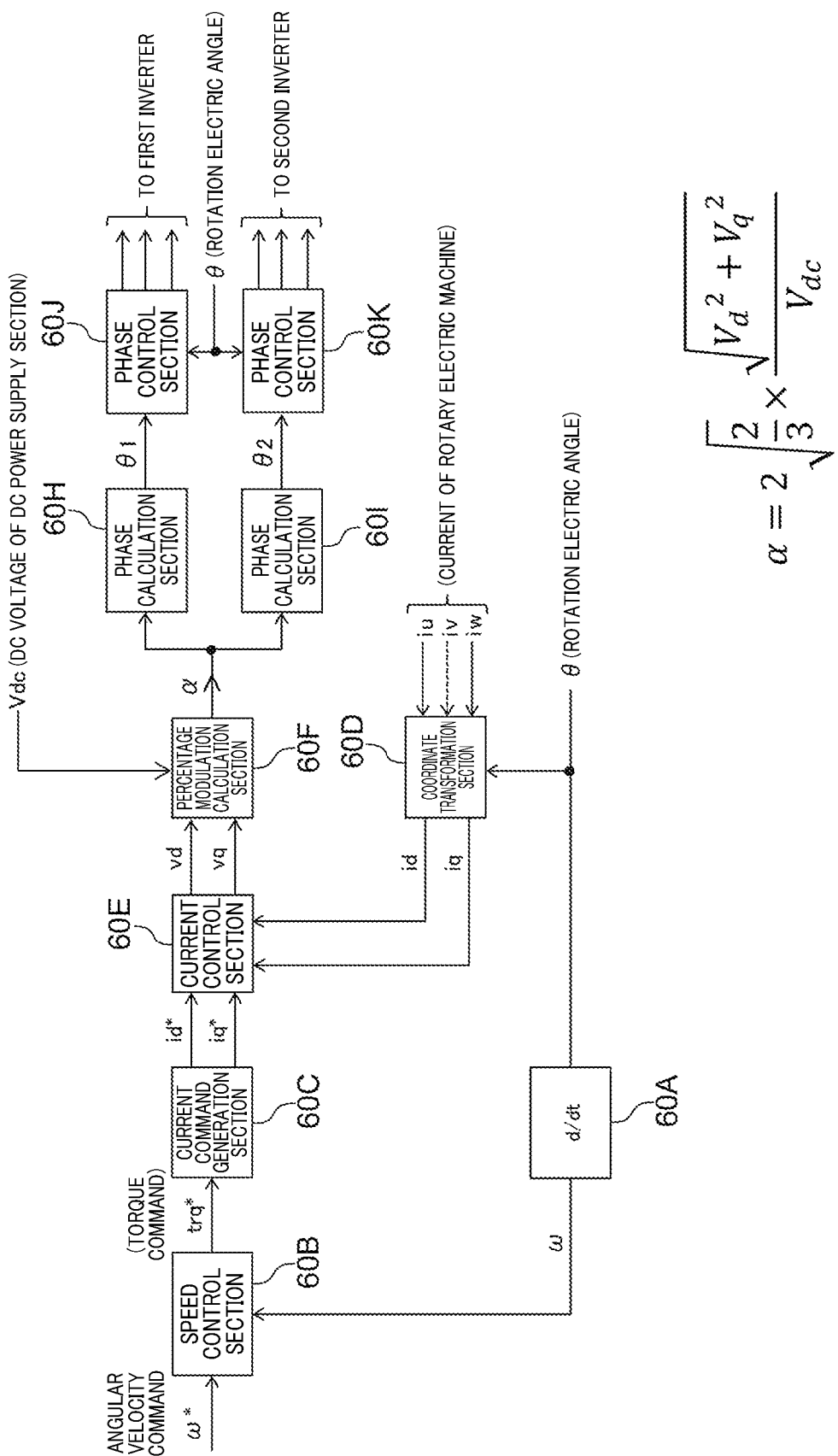
FIG. 3 is a functional block diagram illustrating control by a control section according to the first embodiment.

As shown in FIG. 2A, when the transistors 24A, 40A of the switching elements 24, 40 diagonally located with the coil 12 being interposed therebetween are turned on, voltage of the battery 72 is applied across the coil 12 in the positive direction. As shown in FIG. 2C, when the transistors 38A, 26A of the switching elements 38, 26 diagonally located with the coil 12 being interposed therebetween are turned on, voltage of the battery 72 is applied across the coil 12 in the negative direction. In contrast, as shown in FIG. 2B, when the transistors 24A, 40A of the low-potential side switching elements 26, 40 are turned on, or as shown in FIG. 2D, when the transistors 24A, 38A of the high-potential side switching elements 24, 38 are turned on, voltage is not applied across the coil 12. Repeating these states applies AC voltage to the coil 12. Similarly, AC voltage is applied to the coils 14, 16.

In the first embodiment, the control section 60 includes a differential operation section 60A, a speed control section 60B, a current command generation section 60C, a coordinate transformation section 60D, a current control section 60E, a percentage modulation calculation section 60F, phase calculation sections 60H, 60I, and phase control sections 60J, 60K.

Specifically, the differential operation section 60A differentiates the rotation electric angle θ of the output shaft of the motor generator 10 detected by the rotation angle sensor with respect to time to output angular velocity ω. The speed control section 60B compares the angular velocity ω output from the differential operation section 60A with the angular velocity command value ω*, which is an externally received drive command value for the motor generator 10, to generate a torque command value trq* according to the comparison result and output the torque command value trq*. The current command generation section 60C generates current command values id*, iq* of a d phase and a q phase from the torque command value trq* output from the speed control section 60B and outputs the current command values id*, iq*.

The coordinate transformation section 60D transforms phase currents iu, iv, iw of the motor generator 10 detected by the current detection section 58 into currents id, iq of the d phase and the q phase and outputs the currents id, iq. The current control section 60E compares the currents id, iq of the d phase and the q phase output from the coordinate transformation section 60D with the current command values id*, iq* of the d phase and the q phase output from the current command generation section 60C to generate output voltages vd, vq of the d phase and the q phase according to the comparison result and output the output voltages vd, vq. The percentage modulation calculation section 60F calculates a percentage modulation (percentage of modulation) a according to the following expression (1) based on the output voltages vd, vq of the d phase and the q phase output from the current control section 60E and the DC voltage Vdc of the inverter section output from the voltage detection section 76 and outputs the percentage modulation α.

$$\alpha = 2\sqrt{\frac{2}{3}} \times \frac{\sqrt{vd^2 + vq^2}}{vdc} \quad (1)$$

The phase calculation section 60H calculates a phase $\theta_1$ of an output phase voltage of the first inverter section 22 based on the percentage modulation α output from the percentage modulation calculation section 60F. The phase calculation sections 60I calculates a phase $\theta_2$ of an output phase voltage of the second inverter section 36 based on the percentage modulation α output from the percentage modulation calculation section 60F.

If the percentage modulation α is a threshold value αth or more, a percentage modulation $\alpha_1$ of the first inverter section 22 and a percentage modulation $\alpha_2$ of the second inverter section 36 expressed by the following expression (2) are more than 1. If single-pulse rectangular wave control is applied, the percentage modulation $\alpha_1$ and the percentage modulation $\alpha_2$ are 4/π. The threshold value αth is, for example, 0<αth<√3.

Percentage modulation $\alpha_1$ of the first inverter section, percentage modulation $\alpha_2$ of the second inverter section=(fundamental wave component amplitude of output phase voltage of each inverter section)/(DC voltage of DC power supply section/2) (2)

If the percentage modulation a is the threshold value αth or more, the phase calculation section 60H calculates the phase $\theta_1$ of the output phase voltage of the first inverter section 22 according to the following expression (3) based on the percentage modulation α.

$$\theta_1 = \cos_{-1}(\alpha/2\alpha_1) \quad (3)$$

The phase control section 60J controls switching on/off of the transistors 24 to 34 of the first inverter section 22 based on the phase $\theta_1$ output from the phase calculation section 60H so that the output phase voltage of the first inverter section 22 forms, for example, a waveform modulated with, for example, percentage modulation $\alpha_1$>1, and the phase thereof is the phase $\theta_1$. For modulation with the percentage modulation $\alpha_1$>1, for example, single-pulse rectangular wave control can be applied. Alternatively, overmodulation PWM control may be applied.

If the percentage modulation α is the threshold value αth or more, the phase calculation section 60I calculates the phase $\theta_2$ of the output phase voltage of the second inverter section 36 according to the following expression (4) based on the percentage modulation α.

$$\theta_2 = \pi - \cos_{-1}(\alpha/2\alpha_2) \quad (4)$$

The phase control section 60K controls switching on/off of the transistors 38 to 48 of the second inverter section 36 based on the phase $\theta_2$ output from the phase calculation section 60I so that the output phase voltage of the second inverter section 36 forms, for example, a waveform modulated with, for example, percentage modulation $\alpha_2$>1, and the phase thereof is the phase $\theta_2$. For the modulation with the percentage modulation $\alpha_2$>1, for example, single-pulse rectangular wave control can be applied. Alternatively, overmodulation PWM control may be applied.

Hence, the first inverter section 22 and the second inverter section 36 implement phase shift control that changes a phase difference Δθ (=$\theta_2-\theta_1$) between the phase $\theta_1$ of the output phase voltage of the first inverter section 22 and the phase $\theta_2$ of the output phase voltage of the second inverter section 36 depending on the percentage modulation α. Applying rectangular voltage having a pulse width of the phase difference Δθ to the coils 12 to 16 of the respective phases to drive the motor generator 10.

Figure 4:
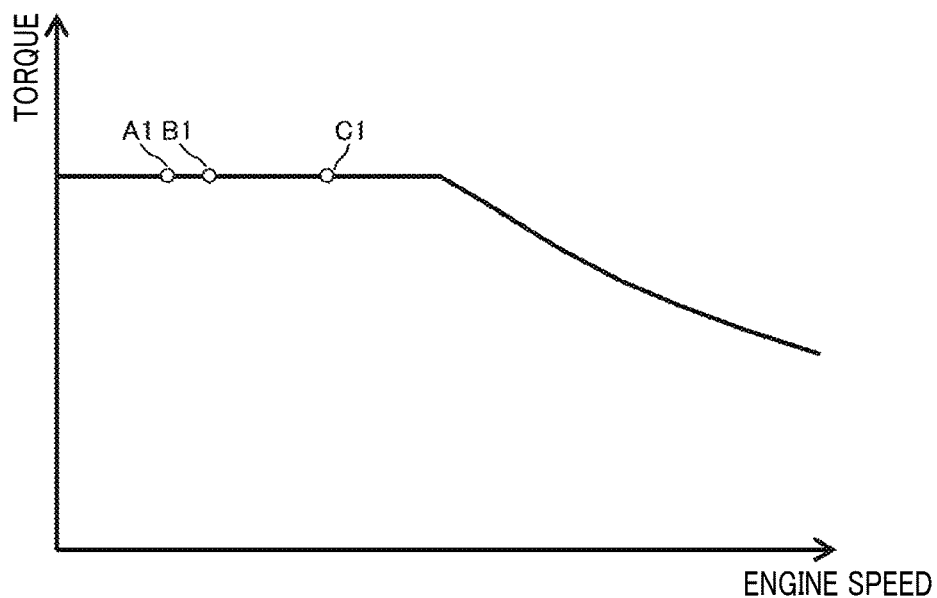
FIG. 4 is a diagram illustrating operating points on output characteristics of a motor generator.
Figure 5:
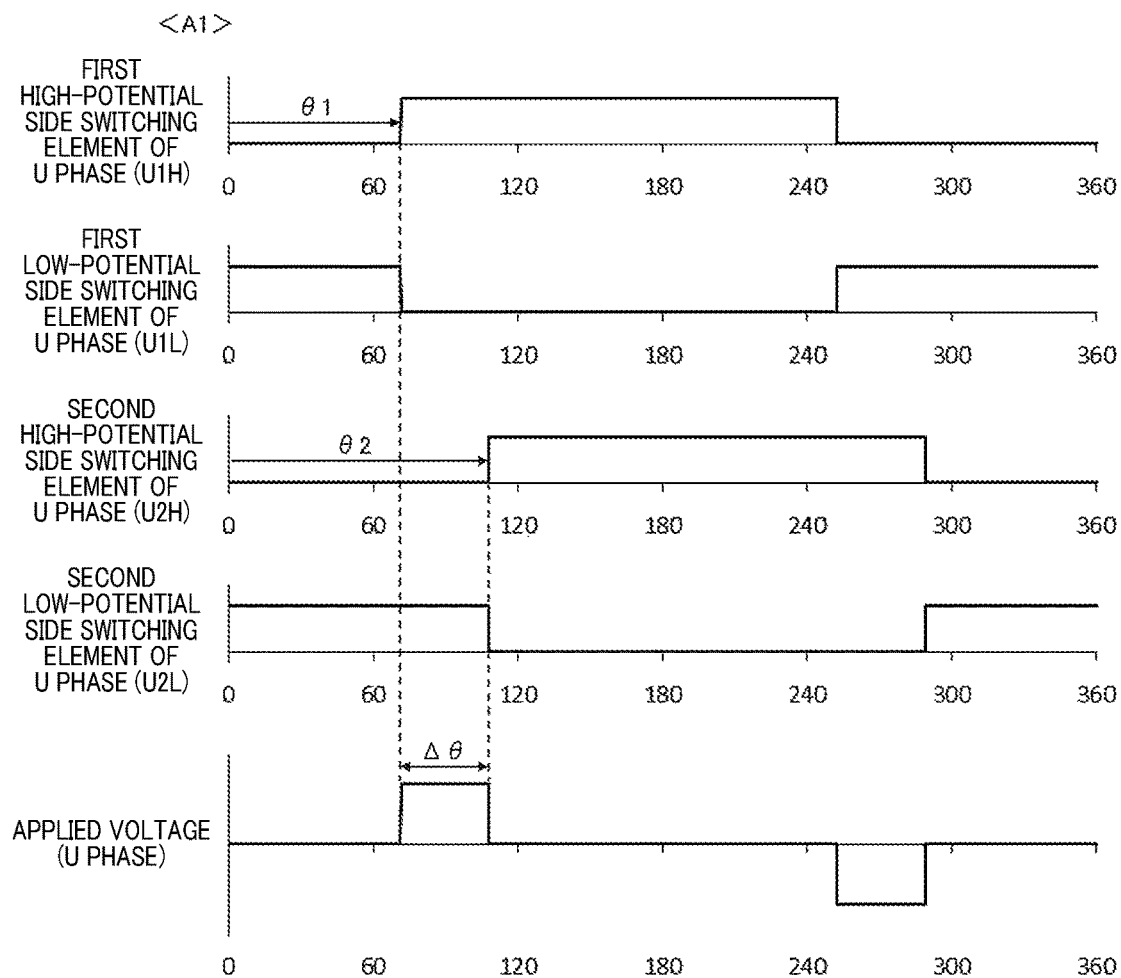
FIG. 5 is a diagram illustrating drive waveforms of an inverter section and a waveform of voltage applied to a coil of the motor generator at an operating point A1.
Figure 6:
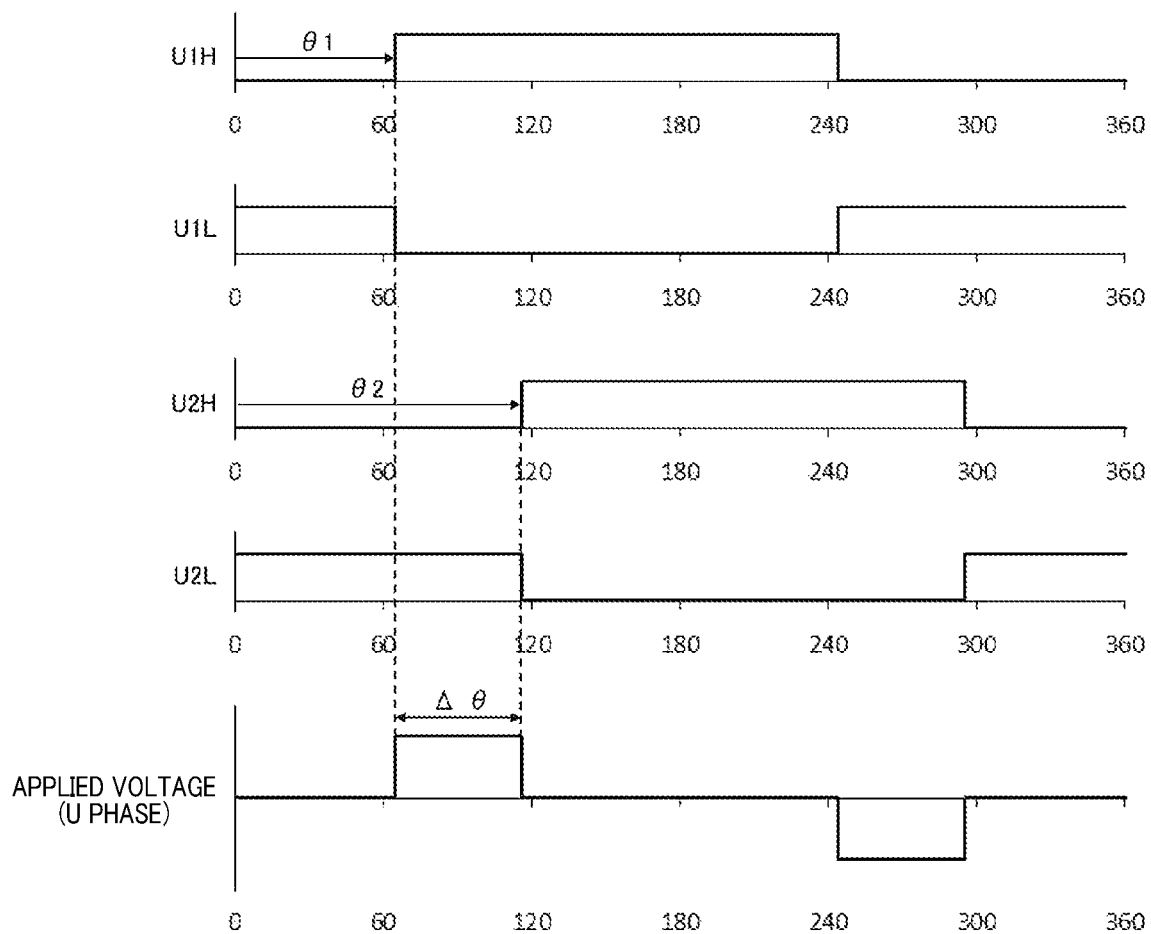
FIG. 6 is a diagram illustrating drive waveforms of the inverter section and a waveform of voltage applied to the coil of the motor generator at an operating point B1.
Figure 7:
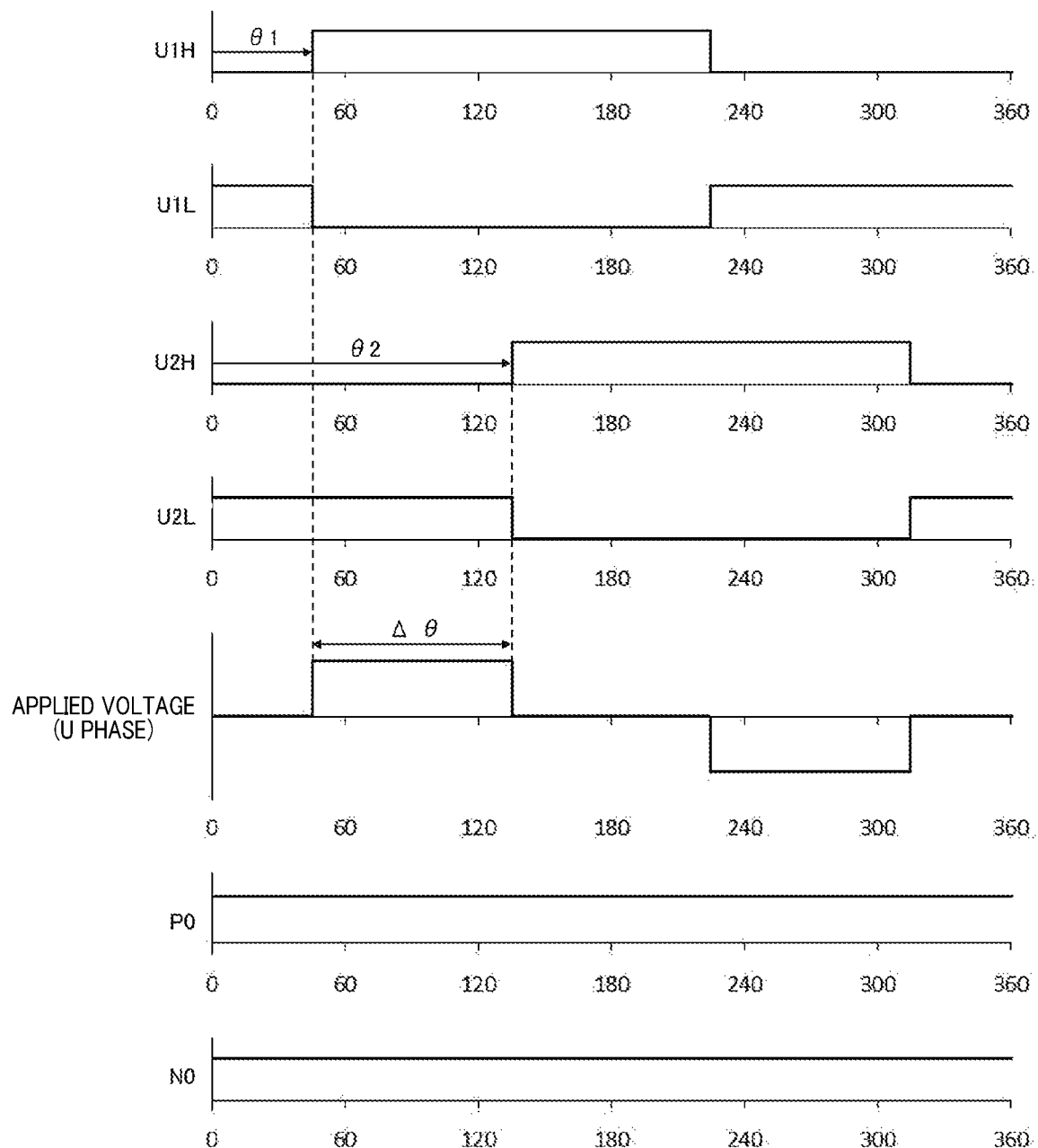
FIG. 7 is a diagram illustrating drive waveforms of the inverter section, a waveform of voltage applied to the coil of the motor generator, and drive waveforms of a switching section, at operating points C1, C2, H2.

FIGS. 5 to 7 illustrate drive waveforms of the inverter sections 22, 36 and waveforms of voltage applied to a coil (in this case, U-phase coil 12) of the motor generator 10 at operating points (A1, B1, C1) shown in FIG. 4 in a case in which single-pulse rectangular wave control is applied. In each of the drawings illustrating drive waveforms including FIGS. 5 to 7, dead time is not considered. As is clear from a comparison between FIGS. 5 to 7, as the operating point shifts to high-speed rotation side, the phase difference Δθ increases. Hence, a time width of voltage applied to the coils 12 to 16 of the motor generator 10 increases.

Figure 8:
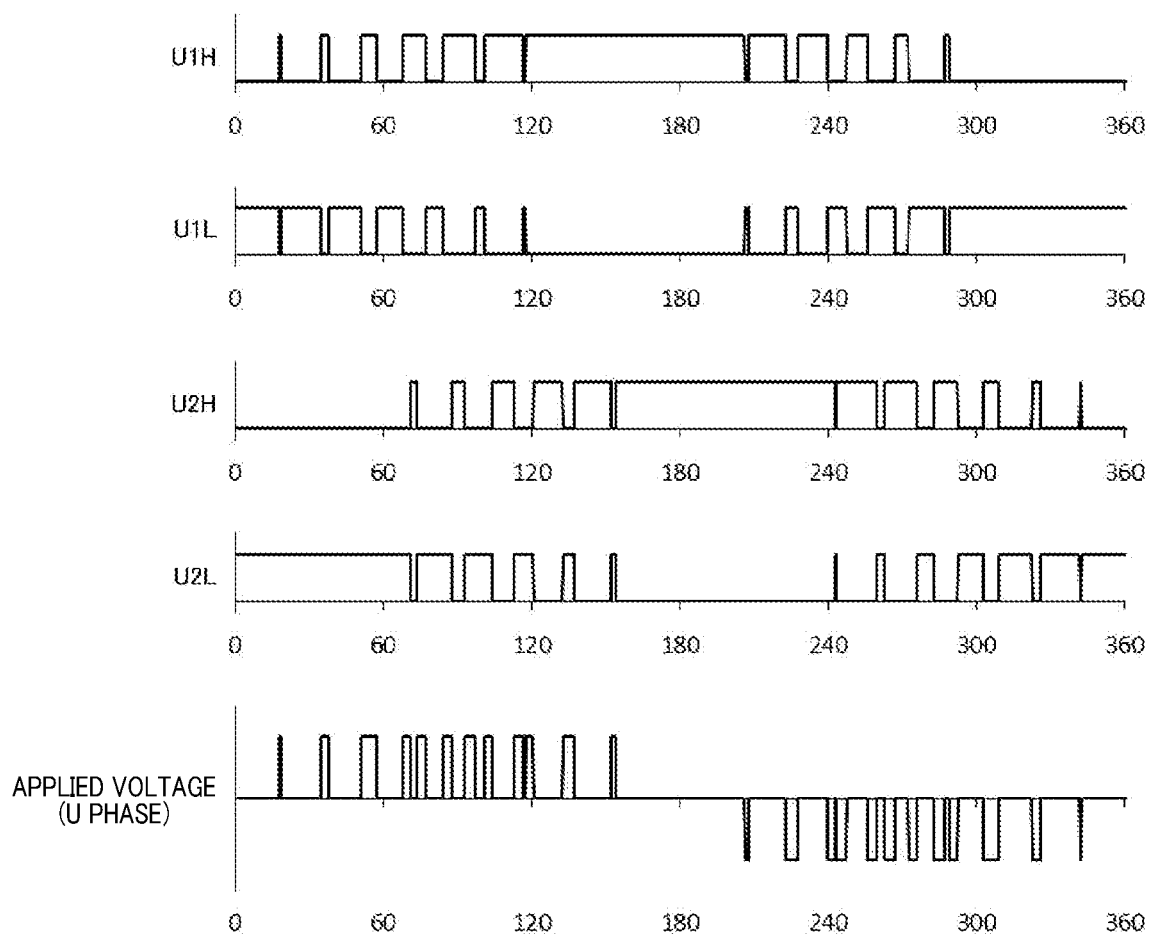
FIG. 8 is a diagram illustrating drive waveforms of the inverter section and a waveform of voltage applied to the coil of the motor generator in a case in which overmodulation PWM control is performed at the operating point A1.
Figure 9:
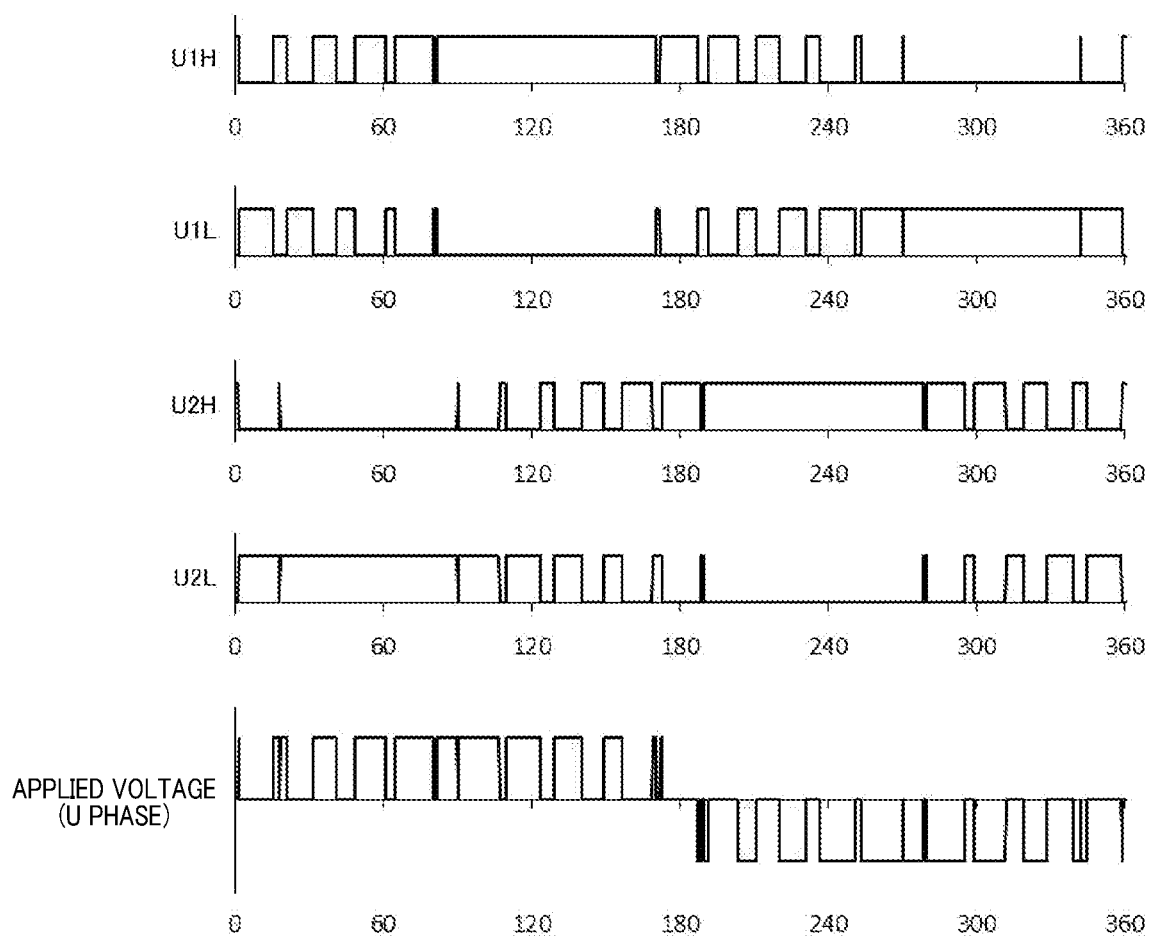
FIG. 9 is a diagram illustrating drive waveforms of the inverter section and a waveform of voltage applied to the coil of the motor generator in a case in which overmodulation PWM control is performed at the operating point C1.

FIGS. 8 and 9 illustrate drive waveforms of the inverter sections 22, 36 and waveforms of voltage applied to a coil of the motor generator 10 in a case in which overmodulation PWM control is applied.

Since the percentage modulations α1, —α2 of the inverter sections 22, 36 are set to more than 1, compared with a case of performing PWM control, frequencies of switching of the transistors 24A to 34A, 38A to 48A of the inverter sections 22, 36 can be decreased by single-pulse rectangular wave control, overmodulation PWM control or the like, whereby switching loss can be decreased. Since phase shift control that changes a phase difference Δθ of an output phase voltage of the inverter sections 22 and 36 depending on the percentage modulation α is performed, voltage applied to the coils 12 to 16 of the motor generator 10 can be adjusted without using a boost converter or the like. Hence, switching loss of the inverter sections 22, 36 can be decreased without increasing the drive unit 20 in size.

Since the threshold value αth is within a range of 0<αth<√3, the motor generator 10 is driven from a low to mid speed rotation range of the motor generator 10 by phase shift control such as single-pulse rectangular wave control and overmodulation PWM control. Hence, switching loss of the inverter section and iron loss of the motor generator 10 due to harmonic components of the carrier wave in PWM control can be decreased. In a mode using the motor generator 10 as a drive source of an electrically driven vehicle, a power ratio in the low to mid speed rotation range frequently used by the electrically driven vehicle can be improved. Noise caused by harmonic components of the carrier wave in PWM control can be also reduced.

Second Embodiment

Next, the second embodiment of the present disclosure will be described. The same parts as those of the first embodiment are denoted by the same reference sign to omit redundant descriptions and illustrations.

In the second embodiment, a mode will be described in which when the percentage modulation $\alpha$ is $\alpha<\alpha$th, PWM control or overmodulation PWM control is applied to at least one of the first inverter section 22 and the second inverter section 36.

Figure 10:
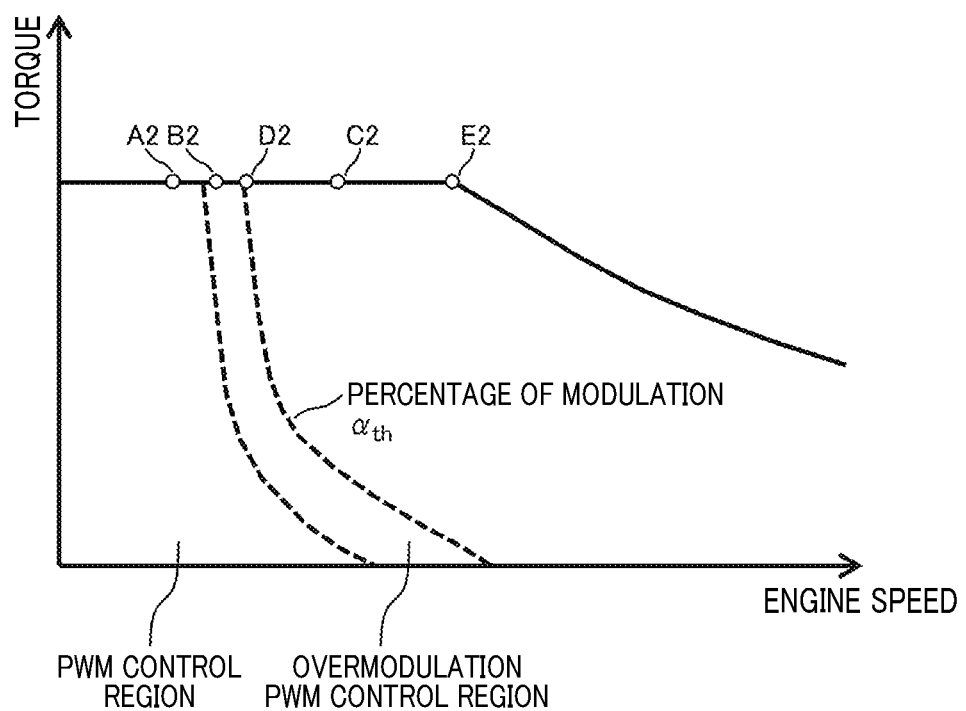
FIG. 10 is a diagram illustrating the operating points and control regions on the output characteristics of the motor generator.
Figure 11:
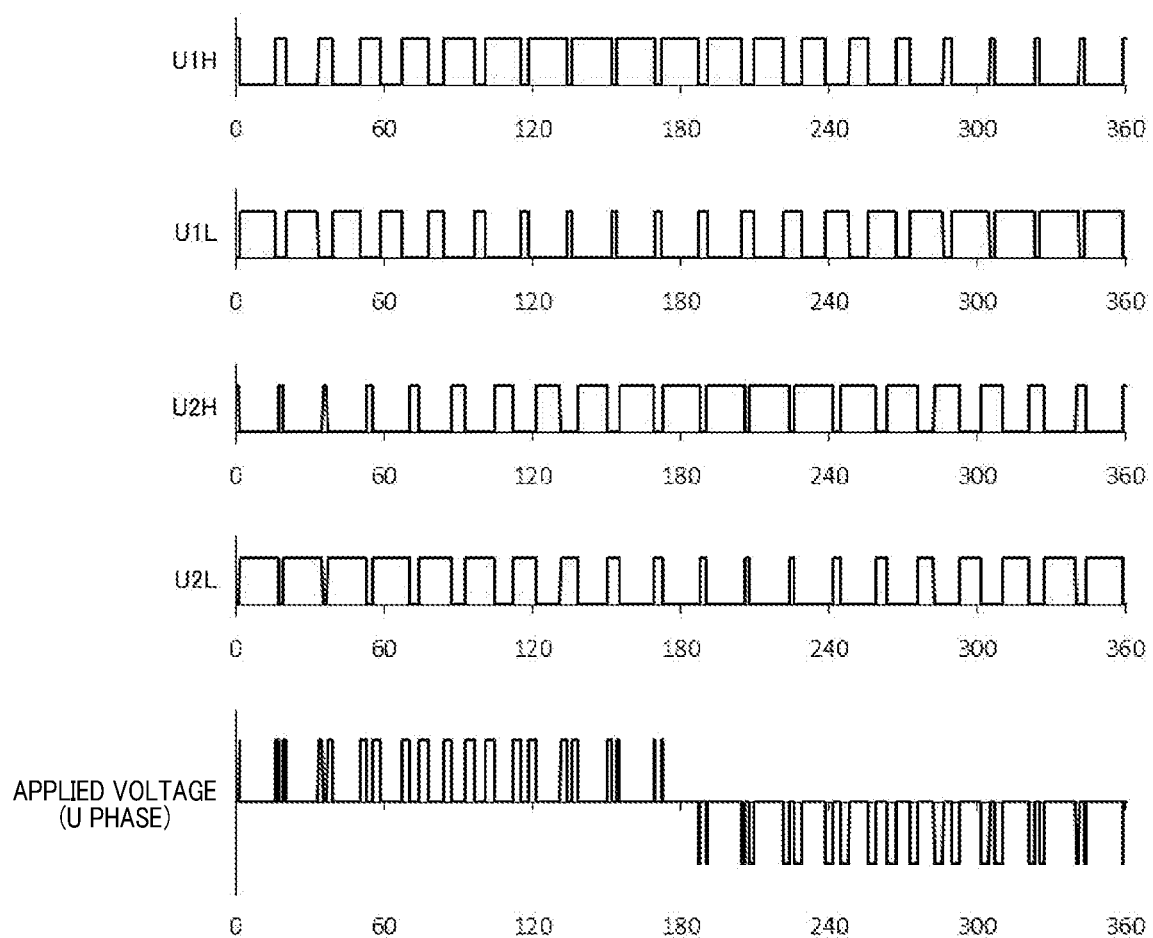
FIG. 11 is a diagram illustrating drive waveforms of the inverter section and a waveform of voltage applied to the coil of the motor generator at the operating point A2.

In the second embodiment, as shown in FIG. 10, the control section 60 performs PWM control, for example, within a low to mid speed rotation range where the percentage modulation $\alpha$ is $0\leq\alpha\leq(\pi/4)$ $\alpha$th. The percentage modulations $\alpha1$, $\alpha2$ of the inverter sections 22, 36 are set to 1 or less. FIG. 11 illustrates drive waveforms of the inverter sections 22, 36 and a waveform of voltage applied to the coil 12 of the motor generator 10 at the operating point A2.

Hence, within a low speed rotation range of the motor generator 10 corresponding to a range where the percentage modulation $\alpha$ is $0\leq\alpha\leq(\pi/4)\alpha$th, a current having a waveform that includes less harmonic distortion and is a sine wave or close to a sine wave can be supplied to the motor generator 10. Hence, pulsation of torque of the motor generator 10 in the low speed rotation range in which inertia is low can be reduced. Thus, in a mode using the motor generator 10 as a drive source of an electrically driven vehicle, drivability of the electrically driven vehicle in a low speed range can be improved.

Figure 12:
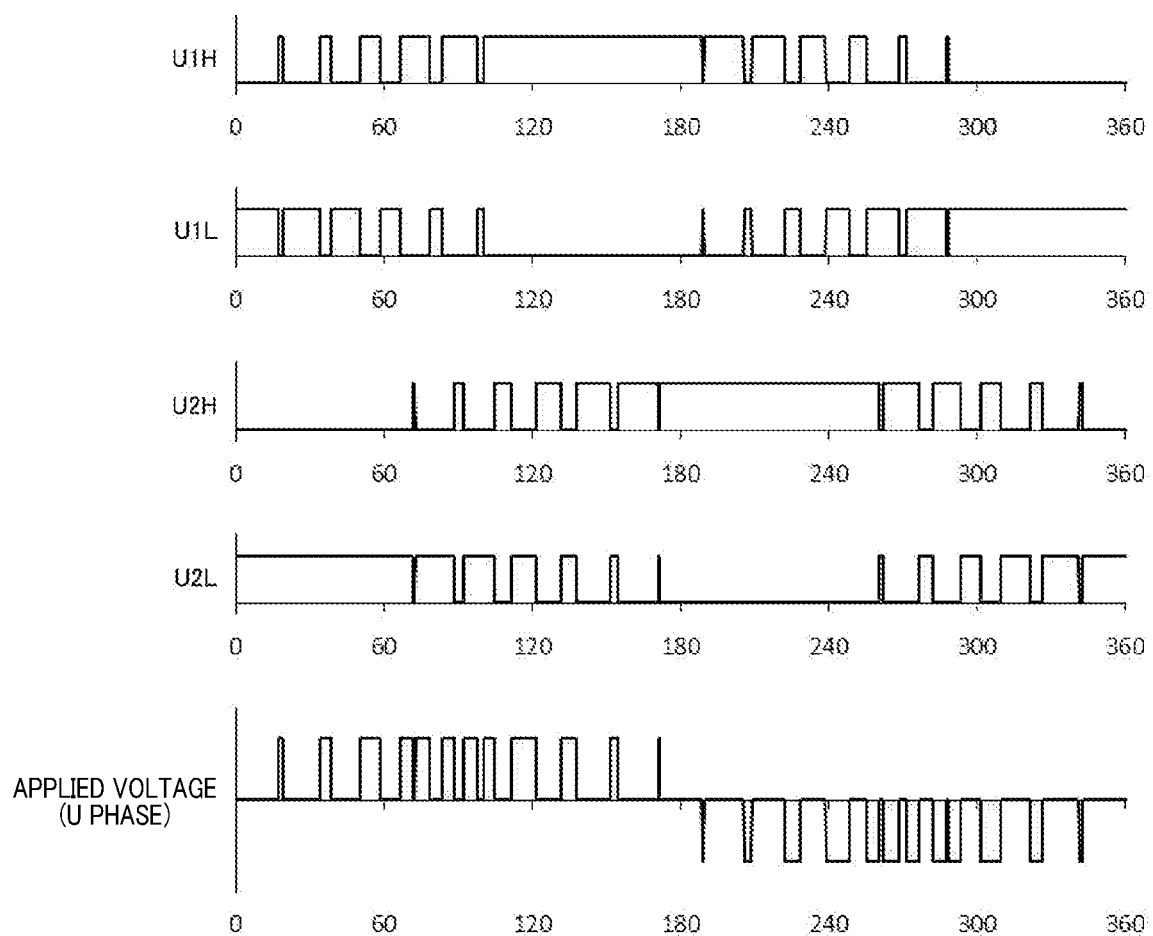
FIG. 12 is a diagram illustrating drive waveforms of the inverter section and a waveform of voltage applied to the coil of the motor generator at the operating points B2, B1.

In the second embodiment, as shown in FIG. 10, for example, the control section 60 performs overmodulation PWM control within a mid speed rotation range of the motor generator 10 corresponding to the range where the percentage modulation $\alpha$ is $(\pi/4)\alpha$th$<\alpha<\alpha$th. The percentage modulations $\alpha1$, $\alpha2$ of the respective inverter sections are set to ranges of $1<(\alpha_1, \alpha_2)<4/\pi$. FIG. 12 illustrates drive waveforms of the inverter sections 22, 36 and a waveform of voltage applied to the coil 12 of the motor generator 10 at the operating point B2.

Figure 13:
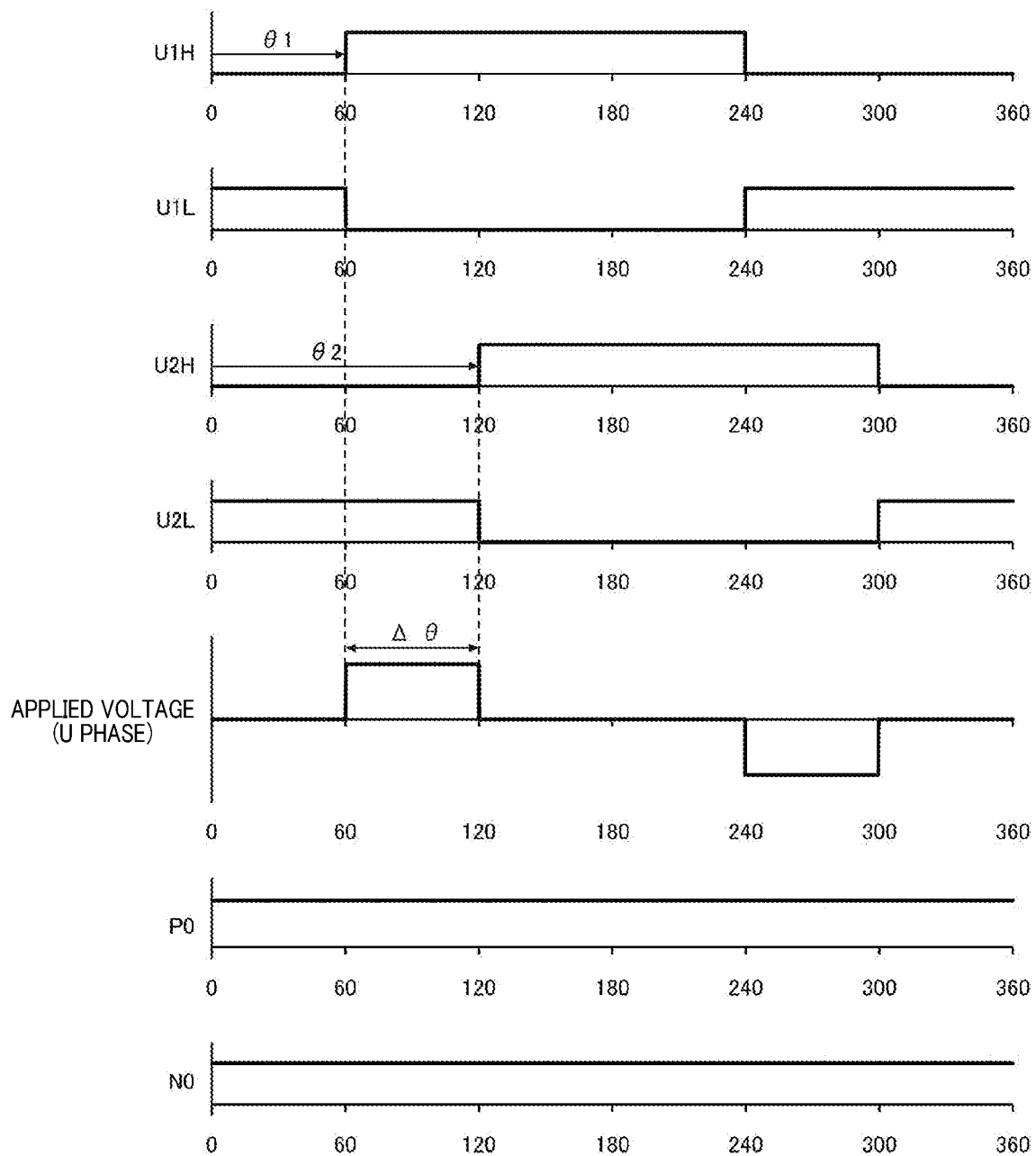
FIG. 13 is a diagram illustrating drive waveforms of the inverter section, a waveform of voltage applied to the coil of the motor generator, and drive waveforms of the switching section, at operating points D2, H1.
Figure 14:
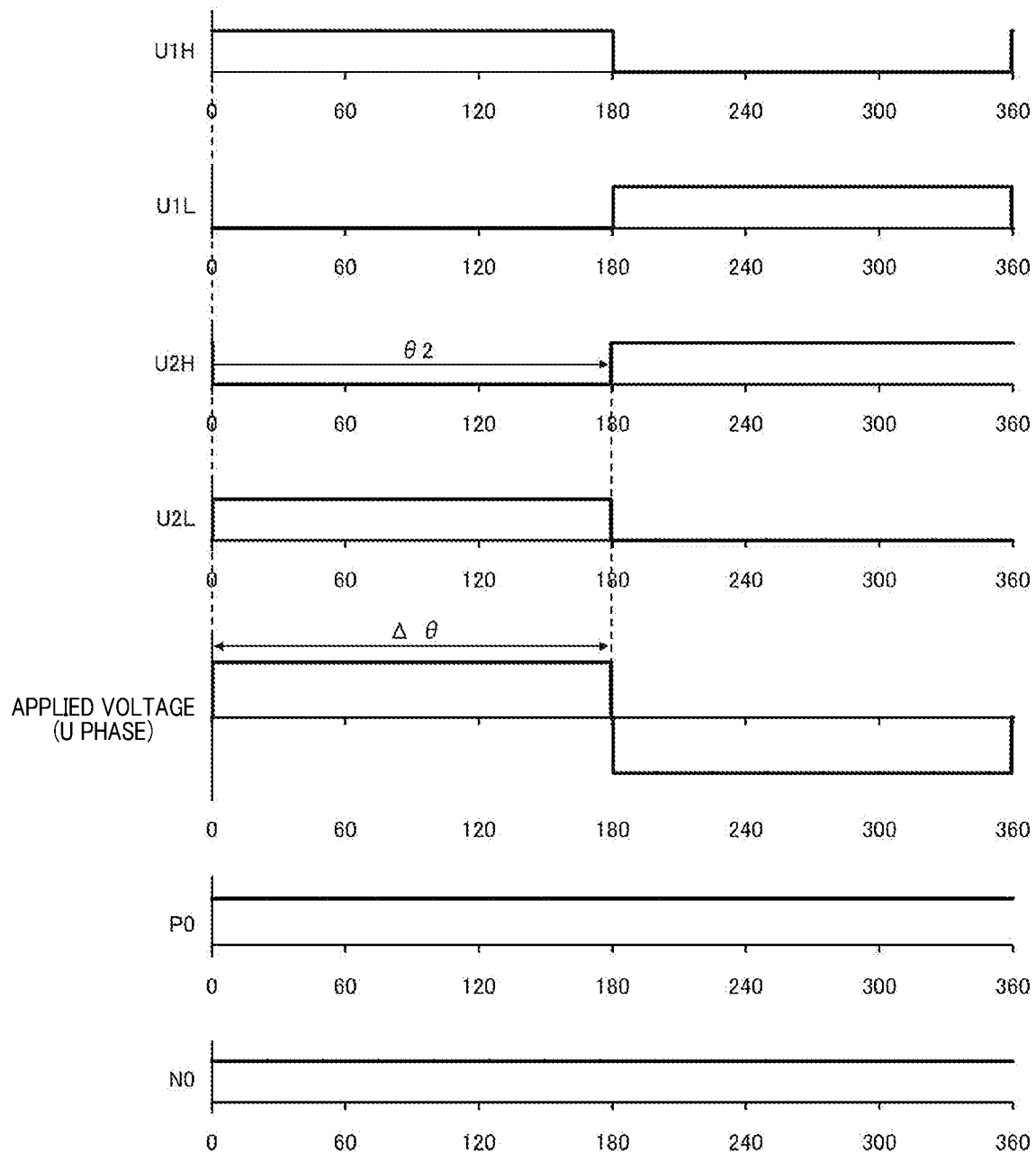
FIG. 14 is a diagram illustrating drive waveforms of the inverter section, a waveform of voltage applied to the coil of the motor generator, and drive waveforms of the switching section, at operating points E2, H3.

FIGS. 13, 7, and 14 illustrate drive waveforms of the inverter sections 22, 36 and waveforms of voltage applied to the coil 12 of the motor generator 10 at the operating points (D2, C2, E2) where $\alpha\geq\alpha$th. If the percentage modulation further increases from the operating point B2 shown in FIG. 12, the waveform shown in FIG. 13 is obtained when the percentage modulation $\alpha$ is $\alpha=\alpha$th.

If the operating point of the motor generator 10 changes A2→B2→D2 as shown in FIG. 10, as shown in FIGS. 11, 12, and 13, the control shifts from PWM control to single-pulse rectangular wave control through overmodulation PWM control. If the operating point of the motor generator 10 change D2→B2→A2 as shown in FIG. 10, as shown in FIGS. 13, 12, and 11, the control shifts from single-pulse rectangular wave control to PWM control through overmodulation PWM control.

As described above, compared with PWM control, performing overmodulation PWM control in the low to mid speed rotation range where the percentage modulation $\alpha$ is less than $\alpha$th and close to $\alpha$th can decrease frequencies of switching of the transistors 24A to 34A, 38A to 48A of the inverter sections 22, 36 and can decrease switching loss.

In the second embodiment, the mode has been described in which if the percentage modulation $\alpha$ is $\alpha<\alpha$th, PWM control is performed if the percentage modulation $\alpha$ is $0\leq\alpha\leq(\pi/4)\alpha$th, and overmodulation PWM control is performed if the percentage modulation $\alpha$ is $(\pi/4)\alpha$th$\leq\alpha\leq\alpha$th. However, the numerical range of the percentage modulation $\alpha$ for switching between PWM control and overmodulation PWM control is not limited to the above. If the percentage modulation $\alpha$ is $\alpha<\alpha$th, only PWM control may be performed.

Third Embodiment

Next, the third embodiment of the present disclosure will be described. The same parts as those of the first and second embodiments are denoted by the same reference sign to omit redundant descriptions.

Figure 15:
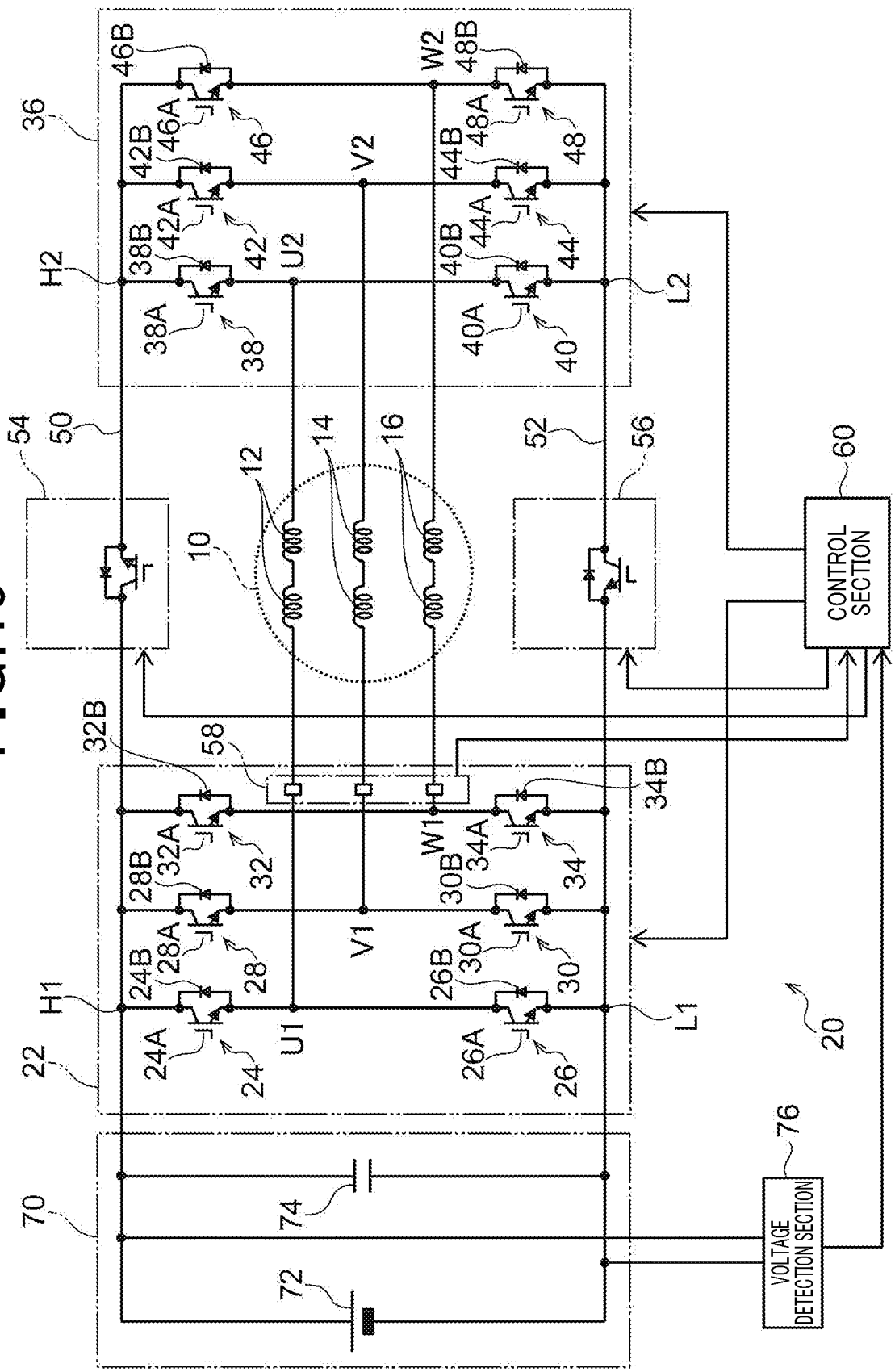
FIG. 15 is a schematic diagram of a drive device for a rotary electric machine according to a third embodiment.

As shown in FIG. 15, in the third embodiment, a high-potential side switching section 54 for opening and closing the high-potential side connection line 50 is provided in the high-potential side connection line 50, and a low-potential side switching section 56 for opening and closing the low-potential side connection line 52 is provided in the low-potential side connection line 52. The high-potential side switching section 54 is an example of a first switch, and the low-potential side switching section 56 is an example of a second switch. The high-potential side switching section 54 and the low-potential side switching section 56 are connected to the control section 60 and are turned on and off by the control section 60.

Figure 16:
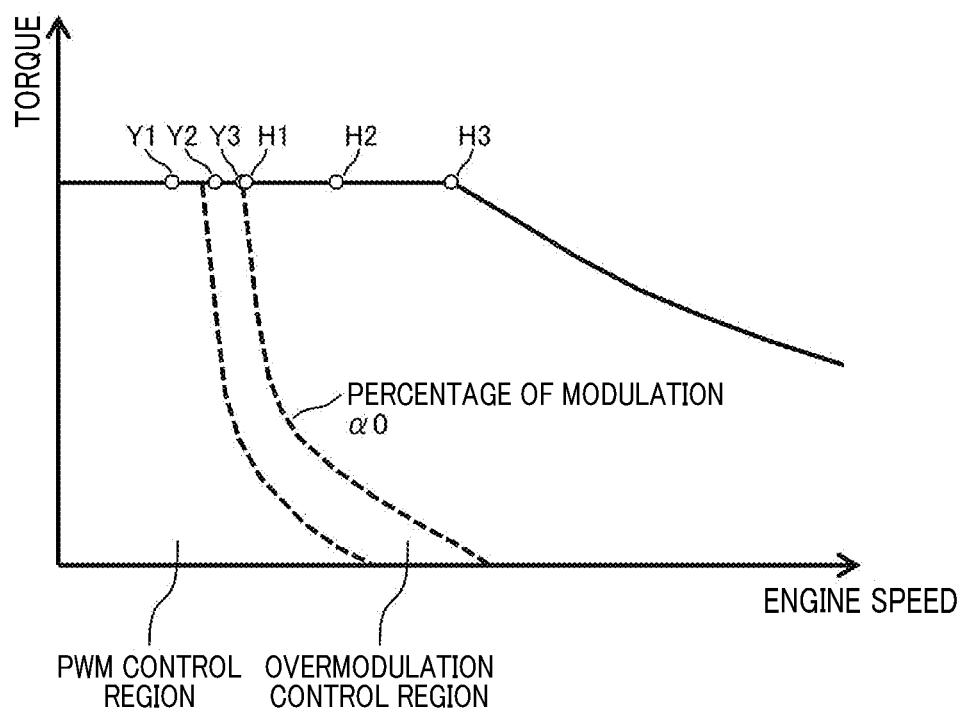
FIG. 16 is a diagram illustrating operating points and control regions on output characteristics of a motor generator.

In the third embodiment, as shown FIG. 16, the control section 60 sets an operation region within a range where the percentage modulation $\alpha$ is $\alpha<\alpha0$ as a star connection drive region, and sets an operation region within a range where the percentage modulation $\alpha$ is $\alpha\geq\alpha0$ (an operation region at the high speed rotation side relative to the star connection drive region) as an open connection drive region. The operation in the open connection drive region has been described with reference to FIGS. 2A to 2D in the first embodiment. It is noted that $\alpha0$ is, for example, $0<\alpha0<4/\pi$.

Figure 17:
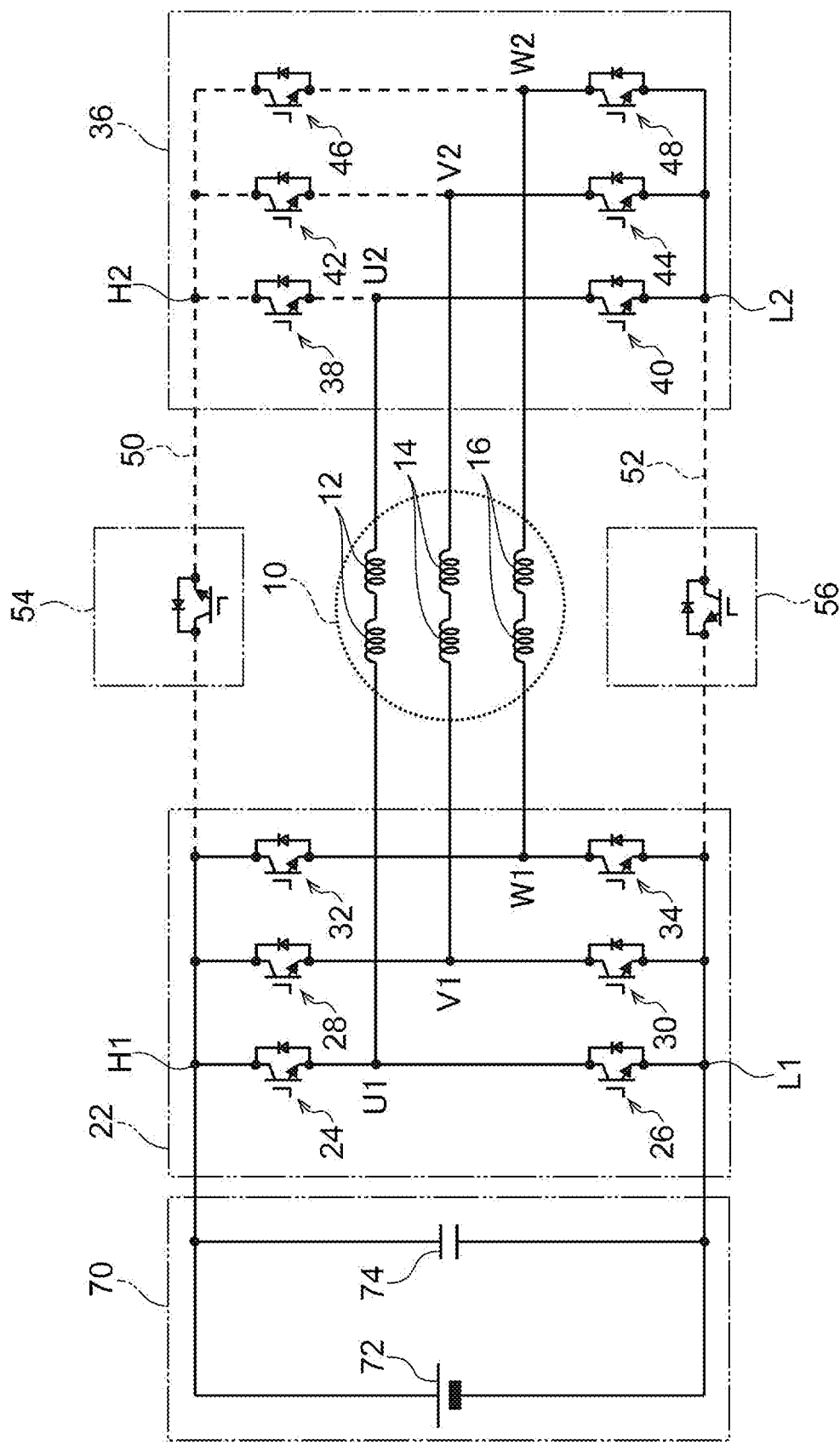
FIG. 17 is a schematic diagram illustrating an example of operation in a star connection drive region.

FIG. 17 illustrates an operation in the star connection drive region. The control section 60 turns off the high-potential side switching section 54 and the low-potential side switching section 56. The control section 60 turns off the respective transistors 38A, 42A, 46A of the second high-potential side switching elements 38, 42, 46 of the second inverter section 36 and turns on the respective transistors 40A, 44A, 48A of the second low-potential side switching elements 40, 44, 48 to cause the second inverter section 36 to operate as a neutral point of the star connection. Then, the control section 60 changes the percentage modulation $\alpha_1$ of the first inverter section 22 to vary the voltage applied to the coils 12 to 16.

Figure 18:
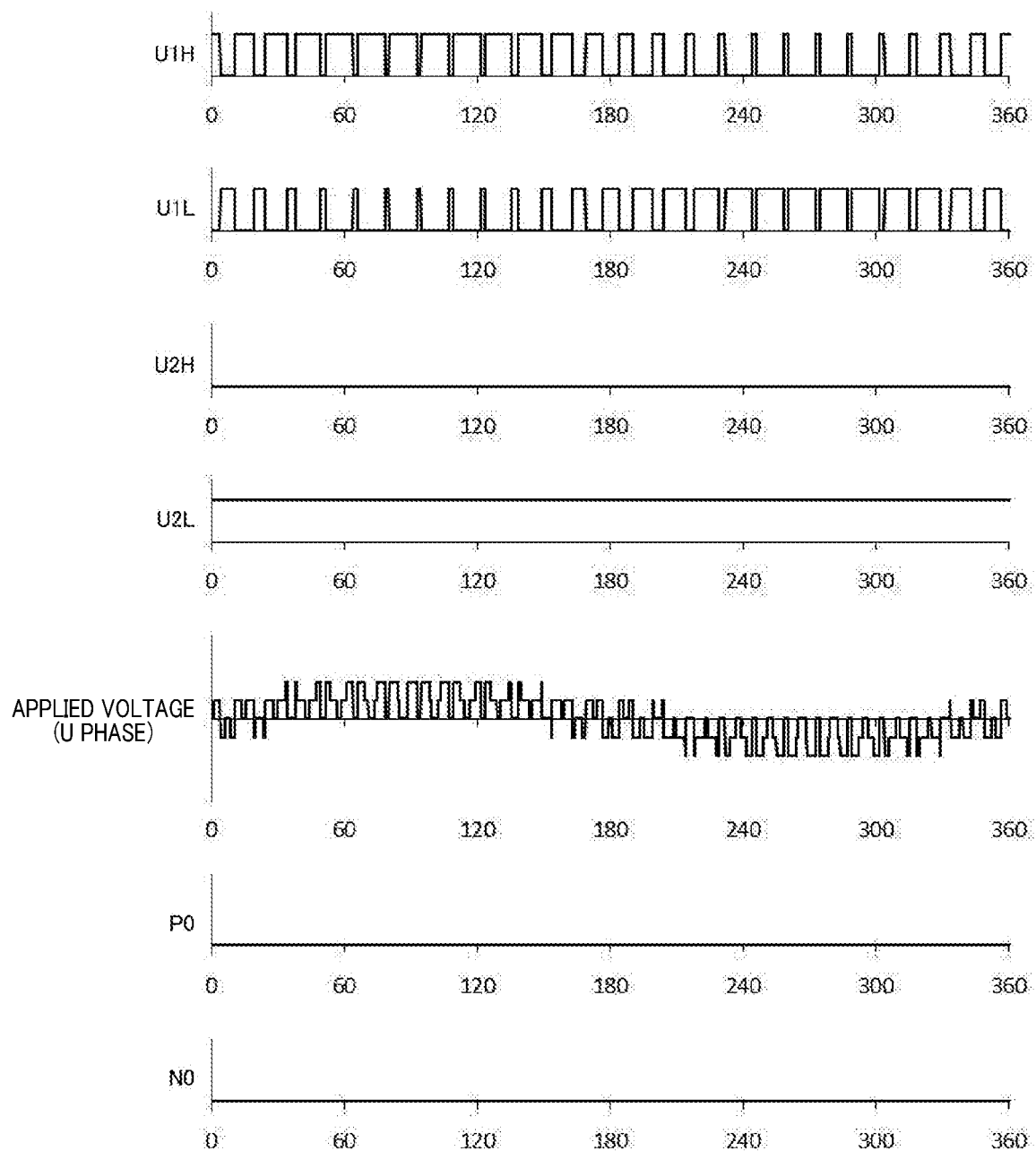
FIG. 18 is a diagram illustrating drive waveforms of an inverter section, a waveform of voltage applied to a coil of the motor generator, and drive waveforms of a switching section, at an operating point Y1.
Figure 19:
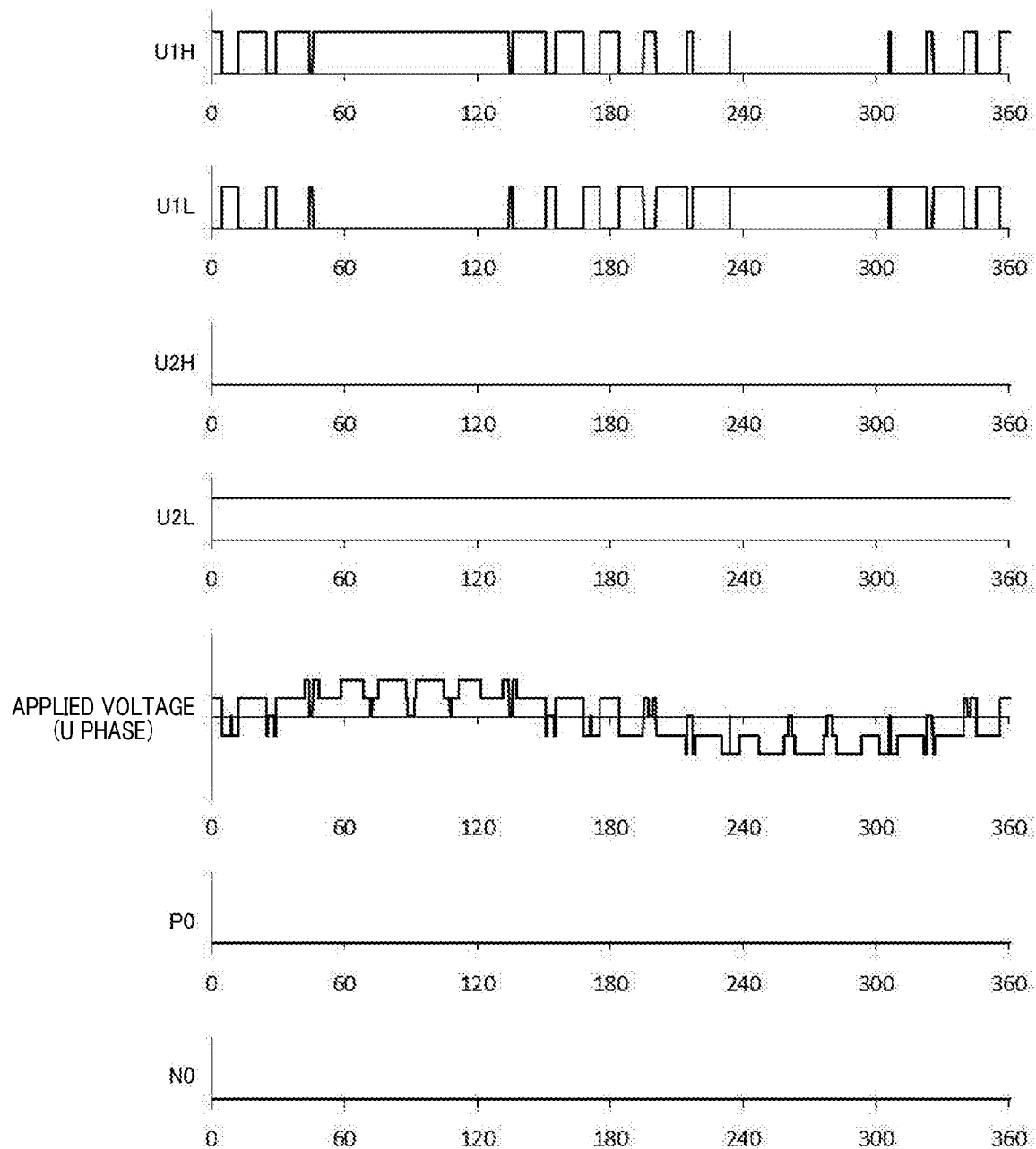
FIG. 19 is a diagram illustrating drive waveforms of the inverter section, a waveform of voltage applied to the coil of the motor generator, and drive waveforms of the switching section, at an operating point Y2.
Figure 20:
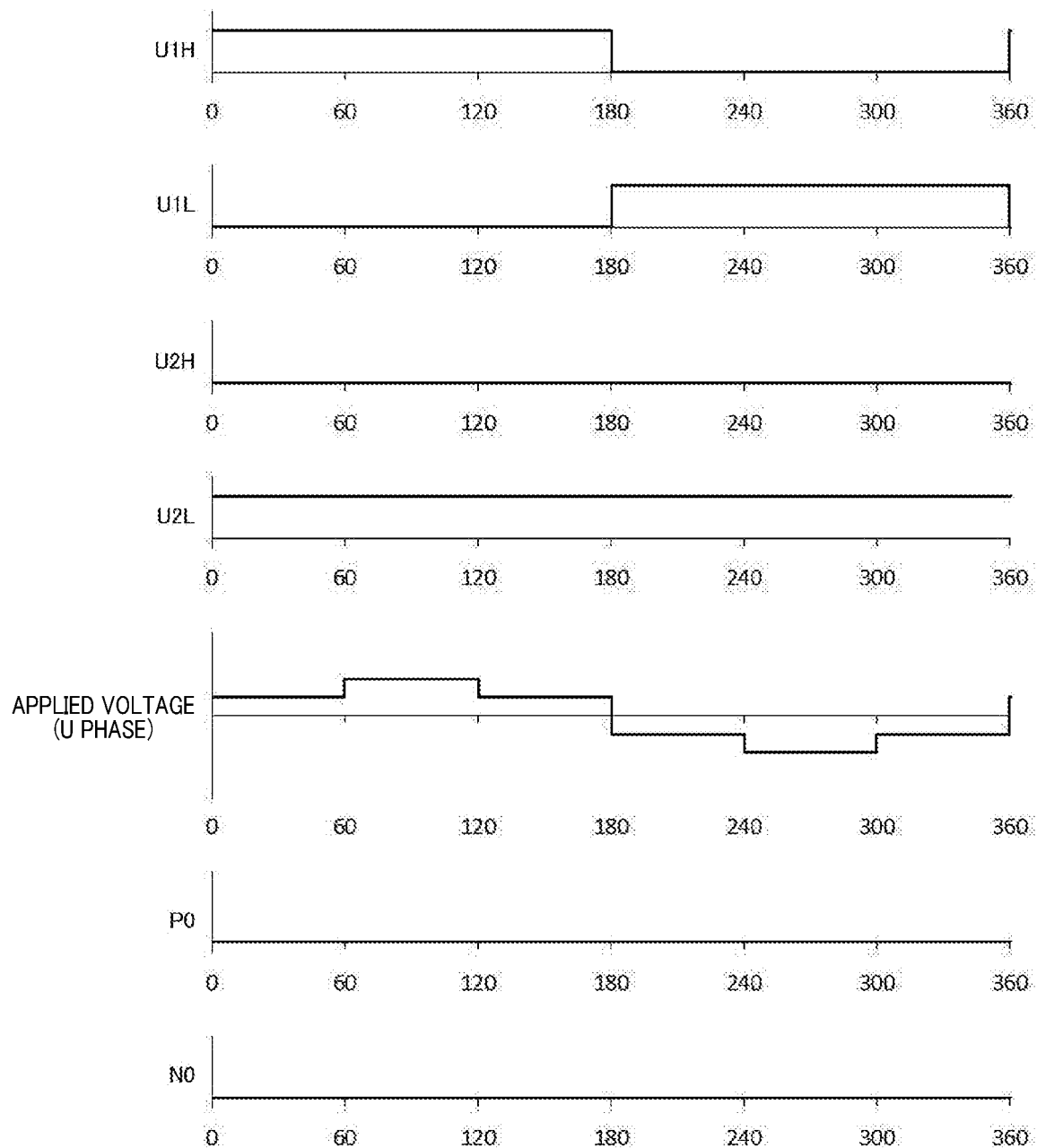
FIG. 20 is a diagram illustrating drive waveforms of the inverter section, a waveform of voltage applied to the coil of the motor generator, and drive waveforms of the switching section, at an operating point Y3.

FIGS. 18 to 20 illustrate drive waveforms of the inverter sections 22, 36, waveforms of voltage applied to the coil 12 of the motor generator 10, and drive waveforms of the switching sections 54, 56, at respective operating points (Y1, Y2, Y3) in star connection drive. FIGS. 13, 7, and 14 illustrate drive waveforms of the inverter sections 22, 36, waveforms of voltage applied to the coil 12 of the motor generator 10, and drive waveforms of the switching sections

54, 56, at respective operating points (H1, H2, H3) in open connection drive. In the star connection drive, the amplitude of the applied voltage is lower than that in the open connection drive. Hence, when PWM control is performed at the same operating point, ripples of currents flowing through the coils 12 to 14 are lower in the star connection drive compared with the open connection drive.

Hence, in the low to mid speed rotation range of the motor generator 10 corresponds to a range where the percentage modulation $\alpha$ is $\alpha<\alpha 0$, since harmonic components included in currents flowing through windings of the motor generator 10 can be reduced, iron loss of the motor generator 10 can be decreased. Thus, in a mode using the motor generator 10 as a drive source of an electrically driven vehicle, a power ratio in the low to mid speed rotation range frequently used by the electrically driven vehicle can be improved.

In addition, in the third embodiment, the control section 60 sets the threshold value $\alpha$th to $\alpha 0<\alpha$th$<\sqrt{3}$ to and applies phase shift control even in the low to mid speed rotation range of the motor generator 10.

Since the threshold value $\alpha$th is within the above numerical range, the motor generator 10 is driven to a rotation range lower than those of the conventional Y-connection-Δ-connection switching drive system and Y-connection-H-bridge switching drive system by phase shift control such as single-pulse rectangular wave control and overmodulation PWM control. Hence, switching loss of the inverter sections 22, 36 and iron loss of the motor generator 10 due to harmonic components of the carrier wave in PWM control can be decreased. Hence, in a mode using the motor generator 10 as a drive source of an electrically driven vehicle, a power ratio in the low to mid speed range frequently used by the electrically driven vehicle can be improved. Noise caused by harmonic components of the carrier wave in PWM control can also be reduced.

Fourth Embodiment

Next, the fourth embodiment of the present disclosure will be described. The same parts as those of the first to third embodiments are denoted by the same reference sign to omit redundant descriptions and illustrations.

In the fourth embodiment, a mode will be described in which, in the star connection drive region, the second inverter section is set as a neutral point of the star connection, and PWM control or overmodulation PWM is applied to the first inverter section 22.

In the fourth embodiment, as shown in FIG. 16, the control section 60 applies PWM control to the first inverter section 22 in the star connection drive region where the percentage modulation $\alpha$ is $0\leq\alpha\leq1$. In FIG. 16, the percentage modulation $\alpha_1$ of the first inverter section 22 is 1 or less. FIG. 18 illustrates drive waveforms of the inverter sections 22, 36, a waveform of voltage applied to the coil 12 of the motor generator 10, and drive waveforms of the switching sections 54, 56, at the operating point Y1

Hence, within a low speed rotation range of the motor generator 10 corresponding to a range where the percentage modulation $\alpha$ is $0\leq\alpha\leq1$, a current having a waveform that includes less harmonic distortion and is a sine wave or close to a sine wave can be supplied to the motor generator 10. Hence, pulsation of torque of the motor generator 10 in the low speed rotation range in which inertia is low can be reduced. Thus, in a mode using the motor generator 10 as a drive source of an electrically driven vehicle, drivability of the electrically driven vehicle in a low speed range can be improved.

In the fourth embodiment, as shown in FIG. 16, for example, the control section 60 applies overmodulation PWM control to the first inverter section 22 within, for example, the star connection drive region where the percentage modulation $\alpha$ is $1<\alpha<4/\pi$. In FIG. 16, the percentage modulation $\alpha_1$ of the first inverter section 22 is $1<\alpha_1<4/\pi$. FIG. 19 illustrates drive waveforms of the inverter sections 22, 36, a waveform of voltage applied to the coil 12 of the motor generator 10, and drive waveforms of the switching section 54, 56, at the operating point Y2. Compared with the operating point Y1, the number of times of switching decreases.

When $\alpha\geq4/\pi$, drive waveforms of the inverter sections 22, 36, waveforms of voltage applied to the coil 12 of the motor generator 10, and drive waveforms of the switching section 54, 56 at the respective operating points (H1, H2, H3) are illustrated in FIGS. 13, 7, and 14. FIG. 16 illustrates a case of $\alpha 0=\alpha$th. In the case of $\alpha 0<\alpha$th, PWM control may be applied in the open connection drive region where $\alpha 0<\alpha<\alpha$th. If the percentage modulation further increases from FIG. 19, the waveform shown in FIG. 20 is obtained at the operating point Y3. If the operating point of the motor generator 10 changes Y1→Y2→Y3→H11→H2→H3 as shown in FIG. 16, as shown in FIGS. 18 to 20, 13, 7, and 14, the control shifts from PWM control to single-pulse rectangular wave control through overmodulation PWM control. If the operating point of the motor generator 10 changes H3→H2→H1→Y3→Y2→Y1 as shown in FIG. 16, as shown in FIGS. 14, 9, 13, 20, 19, and 18, the control shifts from single-pulse rectangular wave control to PWM control through overmodulation PWM control.

Since overmodulation PWM control is performed in the star connection drive region where the percentage modulation $\alpha$ is $1<\alpha<4/\pi$, compared with a case of performing PWM control, frequencies of switching of the transistors of the inverter section can be decreased, and switching loss of the inverter section can be decreased.

In the fourth embodiment, the mode has been described in which, in the star connection drive region, PWM control is performed if the percentage modulation $\alpha$ is in a range of $0\leq\alpha\leq1$, and overmodulation PWM control is performed if the percentage modulation $\alpha$ is in a range of $1<\alpha<4/\pi$. However, the numerical range of the percentage modulation $\alpha$ for switching between PWM control and overmodulation PWM control is not limited to the above. In the star connection drive region, only PWM control may be performed.

Figure 21:
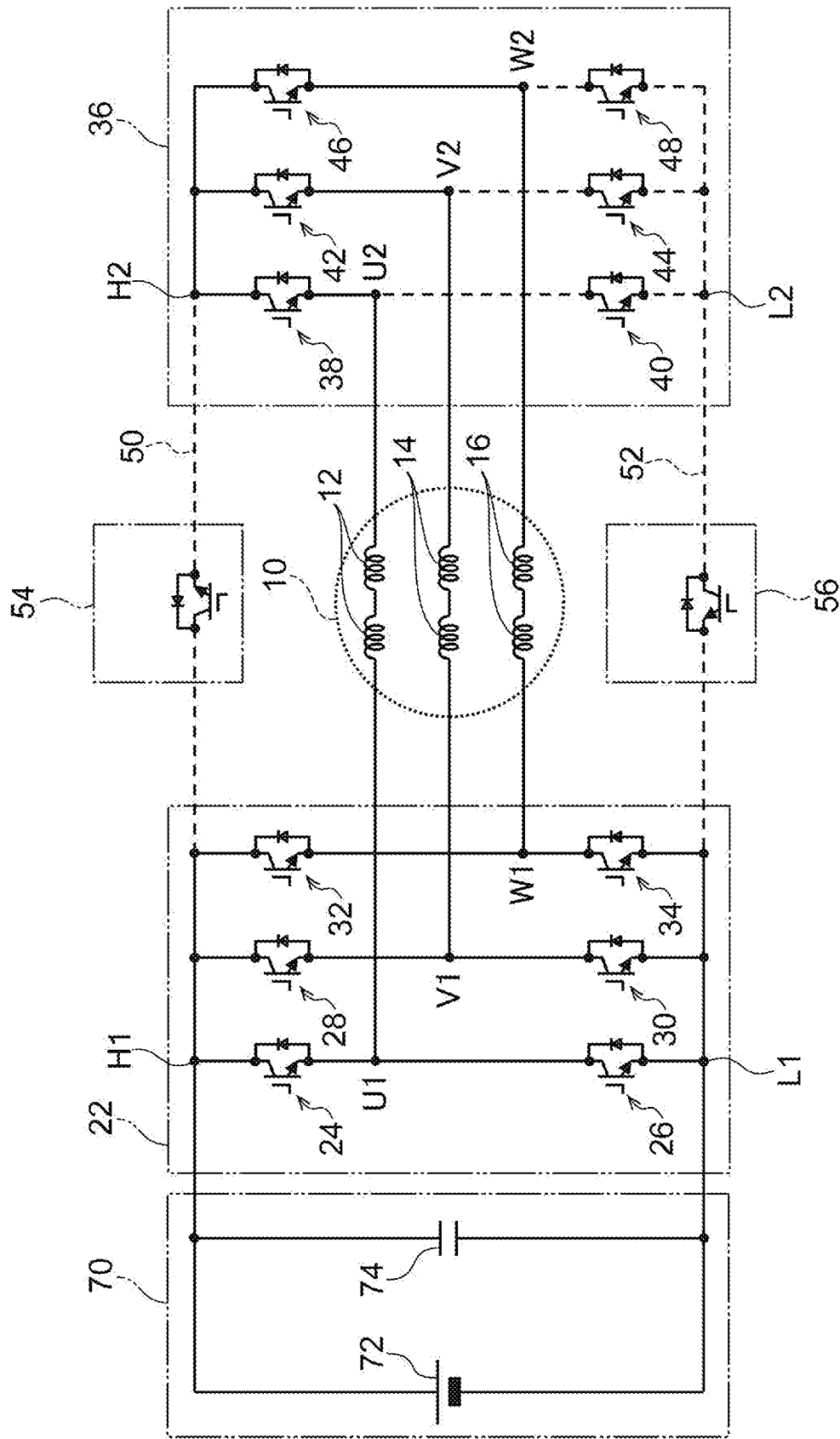
FIG. 21 is a schematic diagram illustrating another example of operation in the star connection drive region.
Figure 22:
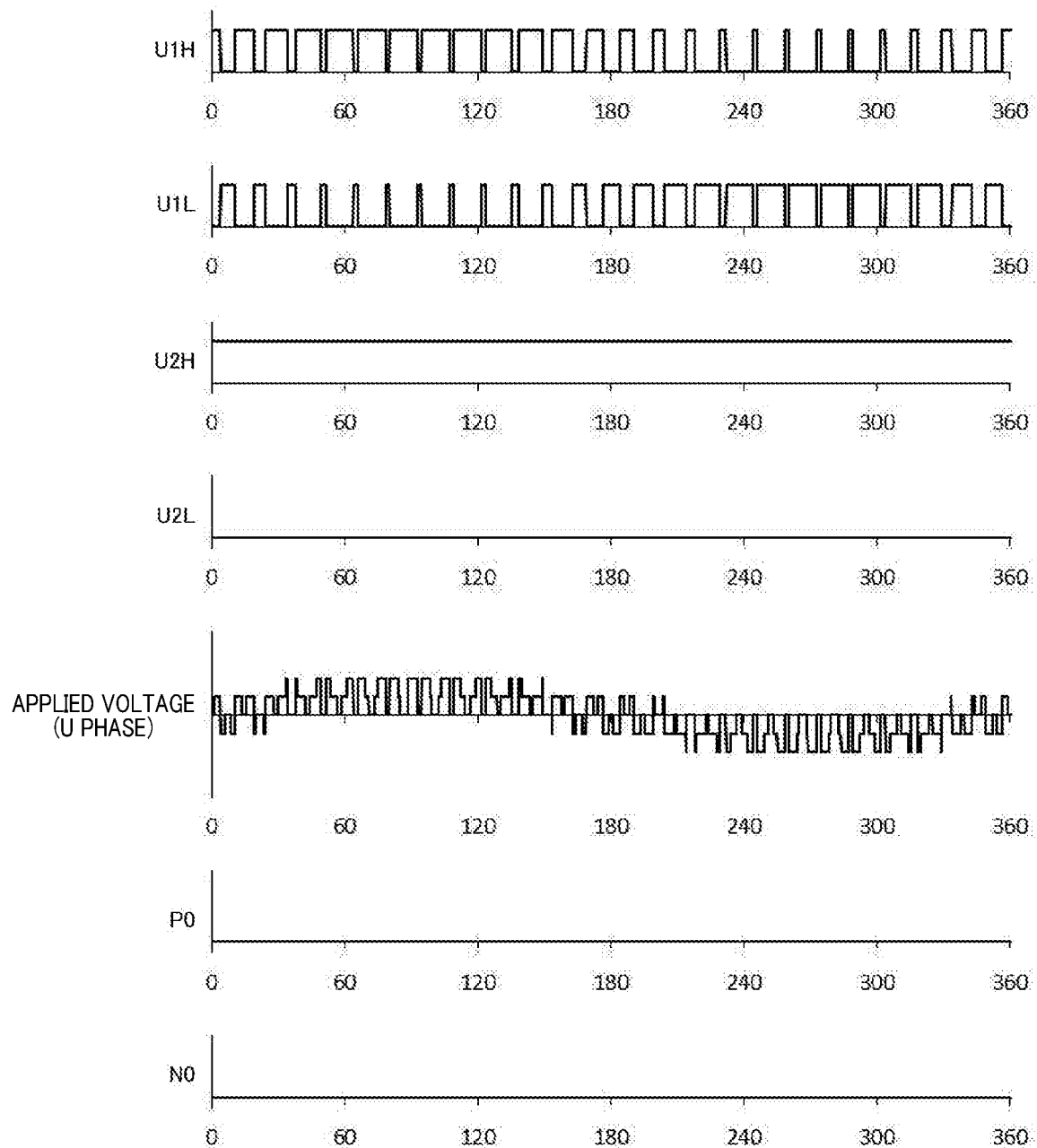
FIG. 22 is a diagram illustrating drive waveforms of the inverter section, a waveform of voltage applied to the coil of the motor generator, and drive waveforms of the switching section, at the operating point Y1 in FIG. 20.

As shown in FIG. 21, the second inverter section 36 may turn on the transistors 38A, 42A, 46A of the second high-potential side switching elements 38, 42, 46 and turn off the transistors 40A, 44A, 48A of the second low-potential side switching elements 40, 44, 48 to cause the second inverter section 36 to operate as a neutral point of the star connection. In this mode, FIG. 22 illustrates drive waveforms of the inverter sections 22, 36, a waveform of voltage applied to the coil 12 of the motor generator 10, and drive waveforms of the switching sections 54, 56, at the operating point Y1 shown in FIG. 16.

Switching between the operation illustrated in FIG. 17 and the operation illustrated in FIG. 21 may be performed at periods sufficiently longer than an electric fundamental period. Hence, a switching element can be selected which produces heat when the second inverter section 36 operates as a neutral point of the star connection. Thereby, the switching control switching between the operation illustrated in FIG. 17 and the operation illustrated in FIG. 21 can distribute thermal stress of the switching elements.

Figure 23:
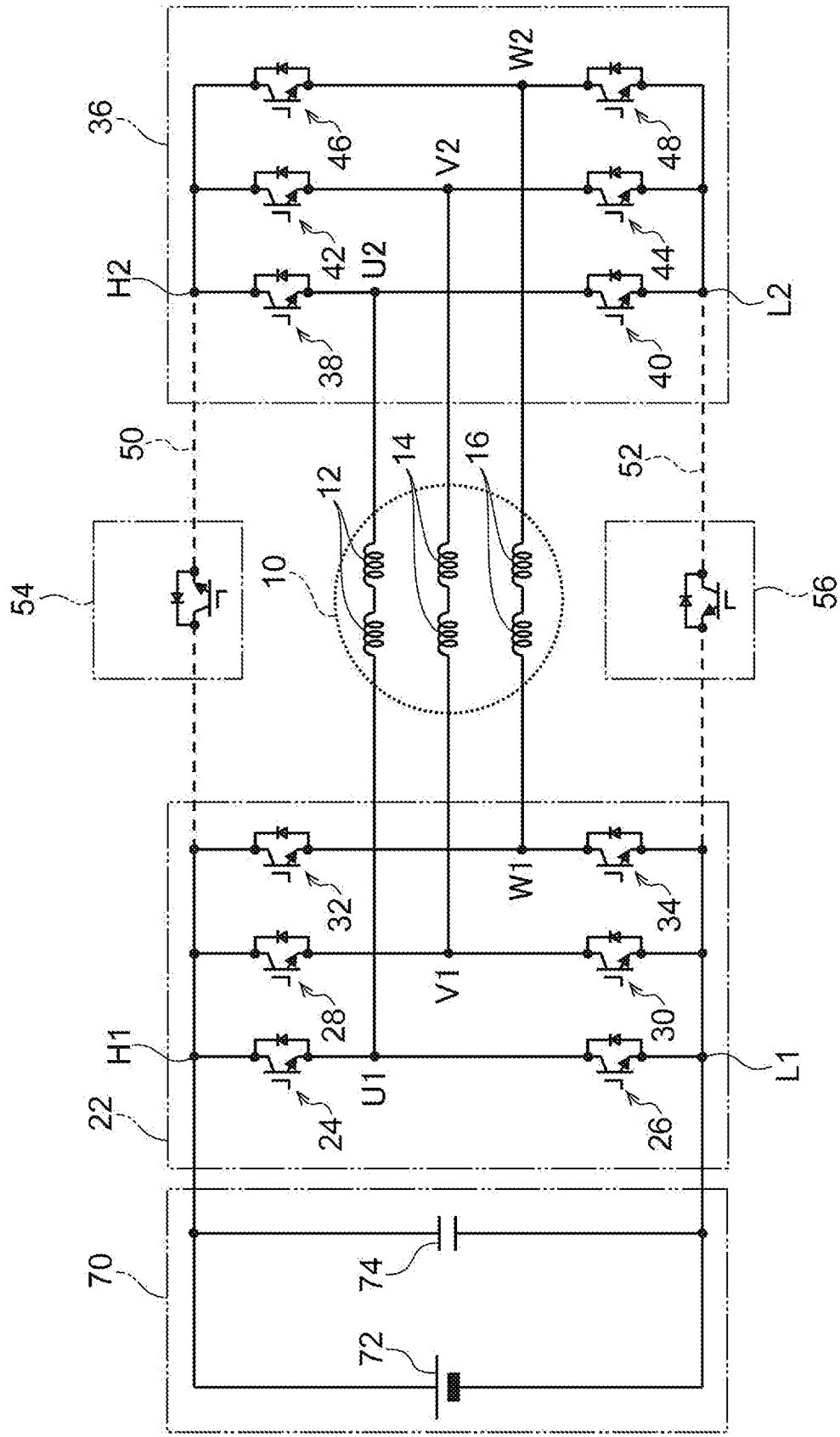
FIG. 23 is a schematic diagram illustrating an example of operation in the star connection drive region.
Figure 24:
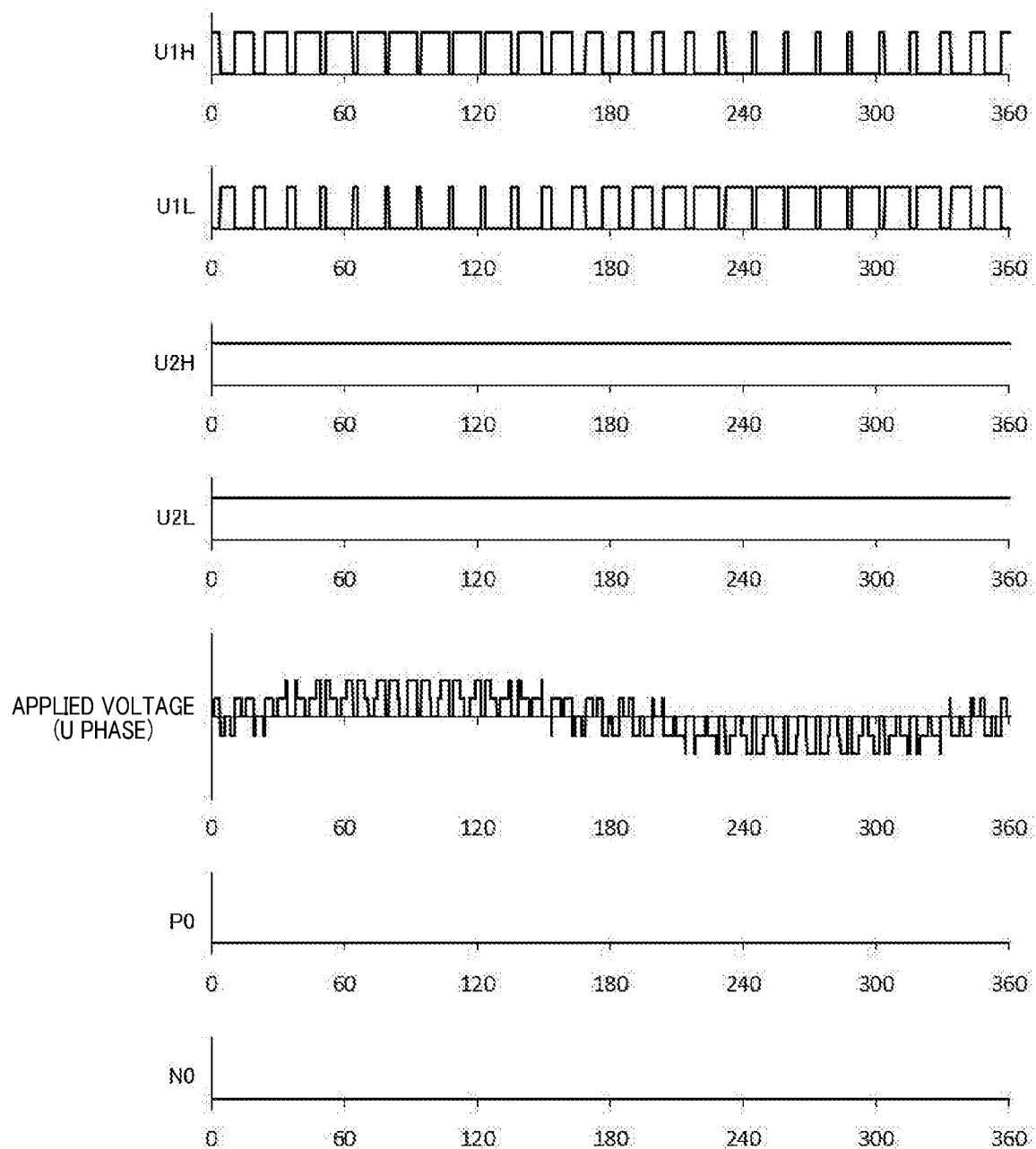
FIG. 24 is a diagram illustrating drive waveforms of the inverter section, a waveform of voltage applied to the coil of the motor generator, and drive waveforms of the switching section, at the operating point Y1 in FIG. 23.

As shown in FIG. 23, the second inverter section 36 may turn on all of the transistors 38A, 42A, 46A of the second high-potential side switching elements 38, 42, 46 and the transistors 40A, 44A, 48A of the second low-potential side switching elements 40, 44, 48 to cause the second inverter section 36 to operate as a neutral point of the star connection. In this mode, FIG. 24 illustrates drive waveforms of the inverter sections 22, 36, a waveform of voltage applied to the coil 12 of the motor generator 10, and drive waveforms of the switching sections 54, 56, at the operating point Y1 shown in FIG. 16. According to this mode, compared with the modes illustrated in FIGS. 17 and 21, conduction loss can be decreased.

Figure 25:
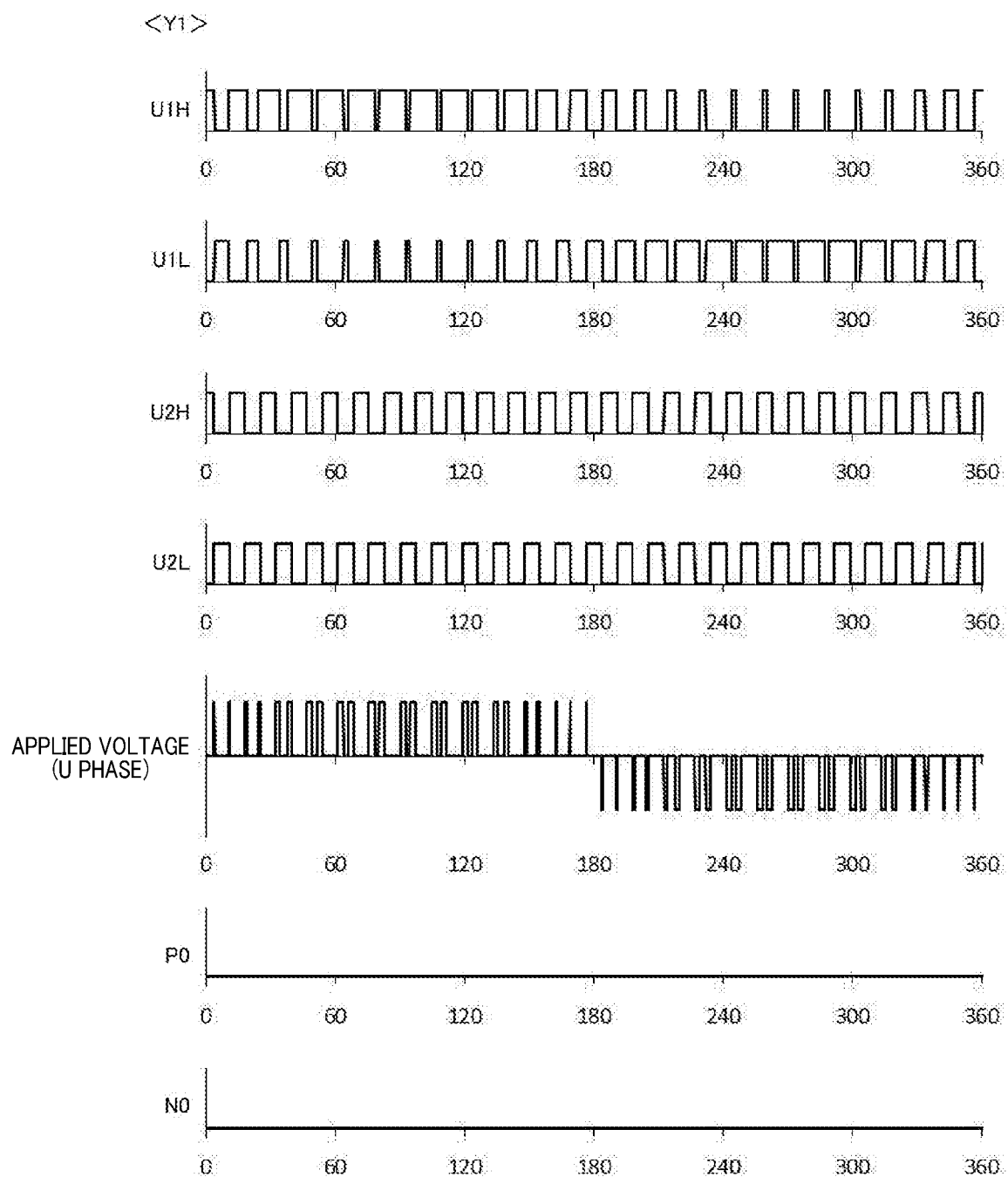
FIG. 25 is a diagram illustrating drive waveforms of the inverter section, a waveform of voltage applied to the coil of the motor generator, and drive waveforms of the switching section, at the operating point Y1 in FIG. 16.

Furthermore, as shown in FIG. 1, the high-potential side switching section 54 and the low-potential side switching section 56 may be omitted. Even when the high-potential side switching section 54 and the low-potential side switching section 56 are omitted, if the percentage modulation $\alpha_2$ of the second inverter section 36 is set to 0 at the operating point Y1 shown in FIG. 16, the second inverter section 36 can be caused to operate as a neutral point of the star connection, and the number of the switching elements can be decreased. In this mode, FIG. 25 illustrates drive waveforms of the inverter sections 22, 36, a waveform of voltage applied to the coil 12 of the motor generator 10, and drive waveforms of the switching sections 54, 56, at the operating point Y1 shown in FIG. 16. The operations of the inverter section 22 and the second inverter section 36 may be interchanged.

Figure 26:
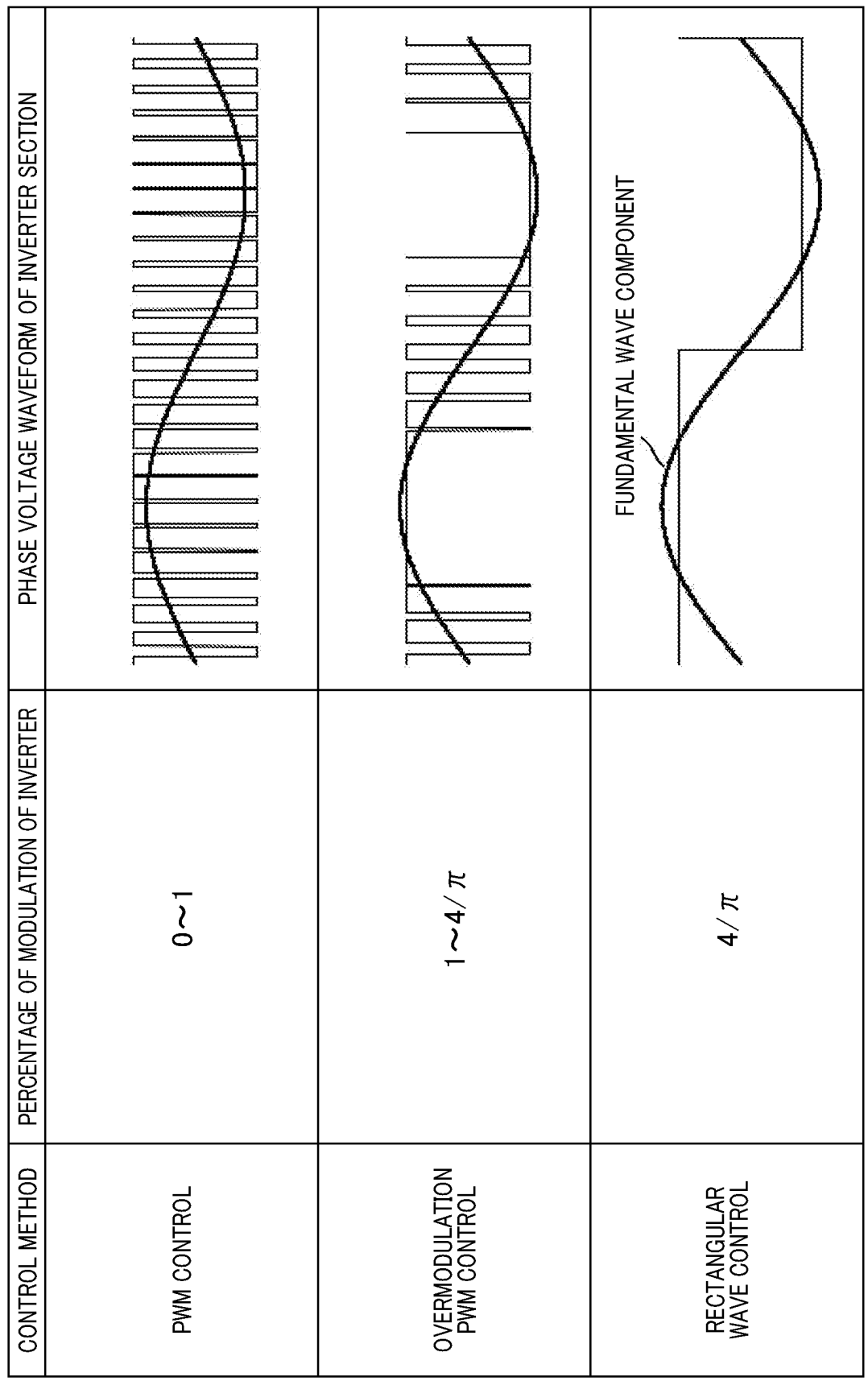
FIG. 26 is an explanatory drawing schematically illustrating PWM control, overmodulation PWM control, and rectangular wave control.

In the above, as a control method in which percentage modulations of the inverter sections 22, 36 are more than 1, single-pulse rectangular wave control and overmodulation PWM control (refer to FIG. 26) have been described. However, the control method is not limited to these and may be, for example, 3-pulse control or 5-pulse control.

The number of phases of the rotary electric machine may be other than three. The type of the rotary electric machine may be a synchronous machine or an induction machine.

The present disclosure has been described according to the embodiments. However, the present disclosure should not be construed as being limited to the embodiments or the configurations. The present disclosure encompasses various modifications, or modifications within the range of equivalence. In addition, various combinations and modes, as well as other combinations and modes, including those which include one or more additional elements, or those which include fewer elements should be construed as being within the scope and spirit of the present disclosure.

The present disclosure provides a drive device for a rotary electric machine, the drive device being able to reduce switching loss of an inverter without increasing the drive device in size.

A first aspect of the present disclosure is a drive device (20) for a rotary electric machine (10). The drive device include:

a first inverter section (22) that includes first high-potential side switching elements (24, 28, 32) and first low-potential side switching elements (26, 30, 34), the first high-potential side switching elements corresponding to respective phases of the rotary electric machine including multiphase windings (12, 14, 16) and opening and closing a part between a first high potential point (H1) and one end of the corresponding winding, the first low-potential side switching elements corresponding to the respective phases of the rotary electric machine and opening and closing a part between one end of the corresponding winding and a first low potential point (L1), the first high potential point being connected to a positive electrode of a DC power supply section (70), the first low potential point being connected a negative electrode of the DC power supply section;

a second inverter section (36) that includes second high-potential side switching elements (38, 42, 46) and second low-potential side switching elements (40, 44, 28), the second high-potential side switching elements corresponding to the respective phased of the rotary electric machine and opening and closing a part between a second high potential point (H2) and the other end of the corresponding winding, the second low-potential side switching elements corresponding to the respective phases of the rotary electric machine and opening and closing a part between the other end of the corresponding winding and a second low potential point (L2), the second high potential point being connected to the first high potential point via a first connection line (50), the second low potential point being connected to the first low potential point via a second connection line (52); and a control section (60) that controls the first inverter section and the second inverter section to drive the rotary electric machine so that if a percentage of modulation (percentage modulation) $\alpha$ expressed by a fundamental wave component amplitude of a phase winding voltage and a DC voltage of the DC power supply section is a threshold value $\alpha$th or more, a percentage of modulations $\alpha_1$ of the first inverter section expressed by a fundamental wave component amplitude of an output phase voltage of the first inverter section and a DC voltage of the DC power supply section and a percentage of modulations $\alpha_2$ of the second inverter section expressed by a fundamental wave component amplitude of an output phase voltage of the second inverter section and a DC voltage of the DC power supply section is more than 1, and so that a phase difference $\Delta\theta$ $(=\theta_2-\theta_1)$ between a phase $\theta_1$ of the output phase voltage of the first inverter section and a phase $\theta_2$ of the output phase voltage of the second inverter section changes depending on the percentage of modulation $\alpha$.

The first aspect of the present disclosure includes the first inverter section, the second inverter section, and the control section. The first inverter section includes first high-potential side switching elements and first low-potential side switching elements corresponding to respective phases of the rotary electric machine including multiphase windings. The first high-potential side switching elements open and close a part between a first high potential point and one end of the corresponding winding. The first low-potential side switching elements open and close a part between one end of the corresponding winding and a first low potential point. The first high potential point is connected to a positive electrode of a DC power supply section (70), and the first low potential point is connected to a negative electrode of the DC power supply section.

The second inverter section includes second high-potential side switching elements and second low-potential side switching elements corresponding to the respective phased of the rotary electric machine. The second high-potential side switching elements open and close a part between a second high potential point and the other end of the corresponding winding. The second low-potential side switching elements open and close a part between the other end of the corresponding winding and a second low potential point.

The second high potential point is connected to the first high potential point via a first connection line. The second low potential point is connected to the first low potential point via a second connection line.

The control section controls the first inverter section and the second inverter section to drive the rotary electric machine so that if a percentage of modulation $\alpha$ expressed by a fundamental wave component amplitude of a phase winding voltage and a DC voltage of the DC power supply section is a threshold value $\alpha$th or more, a percentage of modulations $\alpha_1$ of the first inverter section expressed by a fundamental wave component amplitude of an output phase voltage of the first inverter section and a DC voltage of the DC power supply section and a percentage of modulations $\alpha_2$ of the second inverter section expressed by a fundamental wave component amplitude of an output phase voltage of the second inverter section and a DC voltage of the DC power supply section is more than 1, and so that a phase difference $\Delta\theta$ $(=\theta_2-\theta_1)$ between a phase $\theta_1$ of the output phase voltage of the first inverter section and a phase $\theta_2$ of the output phase voltage of the second inverter section changes depending on the percentage of modulation $\alpha$. Herein, the above control that changes a phase difference $\Delta\theta$ depending on a percentage of modulation $\alpha$ is referred to as phase shift control.

Since the percentages of modulation $\alpha1$, $\alpha2$ are set to more than 1, compared with a case of performing PWM control, frequencies of switching of the switching elements of the transistors can be decreased by rectangular wave control, overmodulation PWM control or the like, whereby switching loss can be decreased. Since a phase difference $\Delta\theta$ of an output phase voltage is changed depending on the percentage of modulation $\alpha$, voltage applied to the rotary electric machine can be adjusted without using a boost converter or the like. Hence, according to the first aspect of the present disclosure, switching loss of the inverter section can be decreased without increasing the drive device in size.

The second aspect of the present disclosure according to the first aspect includes at least one of a first switch (54) that opens and closes a part between the first high potential point and the second high potential point in the first connection line and a second switch (56) that opens and closes a part between the first low potential point and the second low potential point in the second connection line. In a star connection drive region where the percentage of modulation $\alpha$ is $\alpha<\alpha0$, the control section opens at least one of the first switch and the second switch, sets the second inverter as a neutral point of the windings of the rotary electric machine, drives the rotary electric machine by star connection control that changes the percentage of modulation $\alpha$ by the first inverter section. In an open connection drive region where the percentage of modulation $\alpha$ is $\alpha \leq \alpha0$, the control section closes all the switches included in the drive device, and drives the rotary electric machine by open connection control in which a difference voltage between the output phase voltage of the first inverter section and the output phase voltage of the second inverter section is applied to the windings for the respective phases.

The second aspect of the present disclosure includes at least one of a first switch that opens and closes a part between the first high potential point and the second high potential point in the first connection line and a second switch that opens and closes a part between the first low potential point and the second low potential point in the second connection line. Hence, opening at least one of the first switch and the second switch or closing all the switches included in the drive device can switch between star connection control and open connection control. Then, in a star connection drive region where the percentage of modulation $\alpha$ is $\alpha<\alpha0$, at least one of the first switch and the second switch is opened, and the second inverter is set as a neutral point of the windings of the rotary electric machine to drive the rotary electric machine by star connection control that changes the percentage of modulation $\alpha$ by the first inverter section.

Hence, in the low to mid speed rotation range of the rotary electric machine where the percentage of modulation $\alpha$ is $\alpha<\alpha0$, since harmonic components included in currents flowing through the windings of the rotary electric machine can be reduced when PWM control is performed compared with open connection drive, iron loss of the rotary electric machine can be decreased. Thus, in an aspect using the rotary electric machine as a drive source of an electrically driven vehicle, a power ratio in the low to mid speed rotation range frequently used by the electrically driven vehicle can be improved.

In the third aspect of the present disclosure according to the first aspect, if the percentage modulation $\alpha$ is $\alpha<\alpha$th, the control section applies PWM control or overmodulation PWM control to at least one of the first inverter section and the second inverter section to drive the rotary electric machine.

Hence, within a low to mid speed rotation range of the rotary electric machine corresponding to a range where the percentage of modulation $\alpha$ is $\alpha<\alpha$th, a current having a waveform that includes less harmonic distortion and is a sine wave or close to a sine wave can be supplied to the rotary electric machine. Hence, pulsation of torque of the rotary electric machine in the low speed rotation range in which inertia is low can be reduced. Thus, in a mode using the rotary electric machine as a drive source of an electrically driven vehicle, drivability of the electrically driven vehicle in the low speed range can be improved. In the third aspect of the present disclosure, when overmodulation PWM control is performed, compared with a case of performing PWM control, frequencies of switching of the switching elements of the inverter section can be decreased, and switching loss of the inverter section can be decreased.

In the fourth aspect of the present disclosure according to the first or third aspect, the threshold value $\alpha$th is $0<\alpha$th$<\sqrt{3}$.

Since the threshold value $\alpha$th is within the above numerical range, the rotary electric machine is driven from a low to mid speed rotation range thereof by phase shift control such as rectangular wave control and overmodulation PWM control. Hence, switching loss of the inverter section and iron loss of the rotary electric machine due to harmonic components of a carrier wave in PWM control can be decreased. In a mode using the rotary electric machine as a drive source of an electrically driven vehicle, a power ratio of the low to mid speed rotation range frequently used by the electrically driven vehicle can be improved. Noise caused by harmonic components of the carrier wave in PWM control can be also reduced.

In the fifth aspect of the present disclosure according to the second aspect, in the star connection drive region, the control section sets the second inverter section as a neutral point of the windings of the rotary electric machine, and applies PWM control or overmodulation PWM control to the first inverter section to drive the rotary electric machine.

Hence, within a low speed rotation range of the rotary electric machine corresponding to a star connection drive range, a current having a waveform that includes less harmonic distortion and is a sine wave or close to a sine wave can be supplied to the rotary electric machine. Hence, pulsation of torque of the rotary electric machine in the low speed rotation range in which inertia is low can be reduced. Thus, in a mode using the rotary electric machine as a drive source of an electrically driven vehicle, drivability of the electrically driven vehicle in a low speed range can be improved. In the fifth aspect of the present disclosure, when overmodulation PWM control is performed, compared with a case of performing PWM control, frequencies of switching of the switching elements of the inverter section can be decreased, and switching loss of the inverter section can be decreased.

In the sixth aspect of the present disclosure according to the second or fifth aspect, the $\alpha 0$ is $0<\alpha 0<4/\pi$.

In the seventh aspect of the present disclosure according to the second, fifth, or sixth aspect, the threshold value $\alpha$th is $\alpha 0<\alpha$th$<\sqrt{3}$.

Since the threshold value $\alpha$th is within the above numerical range, the rotary electric machine is driven to a rotation range lower than those of the conventional Y-connection-Δ-connection switching drive system and Y-connection-H-bridge switching drive system by phase shift control such as rectangular wave control and overmodulation PWM control. Hence, switching loss of the inverter section and iron loss of the rotary electric machine due to harmonic components of the carrier wave in PWM control can be decreased. Hence, in a mode using the rotary electric machine as a drive source of an electrically driven vehicle, a power ratio of the low to mid speed rotation range frequently used by the electrically driven vehicle can be improved. Noise caused by harmonic components of the carrier wave in PWM control can be also reduced.

According to the above aspects, the drive device for a rotary electric machine of the present disclosure can reduce switching loss of an inverter without increasing the drive device in size.

What is claimed is:

1. A drive device for a rotary electric machine, the drive device comprising:
    a first inverter section that includes first high-potential side switching elements and first low-potential side switching elements, the first high-potential side switching elements corresponding to respective phases of the rotary electric machine including multiphase windings and opening and closing a part between a first high potential point and one end of the corresponding winding, the first low-potential side switching elements corresponding to the respective phases of the rotary electric machine and opening and closing a part between one end of the corresponding winding and a first low potential point, the first high potential point being connected to a positive electrode of a DC power supply section, the first low potential point being connected to a negative electrode of the DC power supply section;
    a second inverter section that includes second high-potential side switching elements and second low-potential side switching elements, the second high-potential side switching elements corresponding to the respective phases of the rotary electric machine and opening and closing a part between a second high potential point and the other end of the corresponding winding, the second low-potential side switching elements corresponding to the respective phases of the rotary electric machine and opening and closing a part between the other end of the corresponding winding and a second low potential point, the second high potential point being connected to the first high potential point via a first connection line, the second low potential point being connected to the first low potential point via a second connection line; and
    a control section that controls the first inverter section and the second inverter section to drive the rotary electric machine so that if a percentage of modulation $\alpha$ expressed by a fundamental wave component amplitude of a phase winding voltage and a DC voltage of the DC power supply section is a threshold value $\alpha$th or more, a percentage of modulations $\alpha_1$ of the first inverter section expressed by a fundamental wave component amplitude of an output phase voltage of the first inverter section and a DC voltage of the DC power supply section and a percentage of modulations $\alpha_2$ of the second inverter section expressed by a fundamental wave component amplitude of an output phase voltage of the second inverter section and a DC voltage of the DC power supply section are each more than 1, and so that a phase difference $\Delta\theta$ ($=\theta_2-\theta_1$) between a phase $\theta_1$ of the output phase voltage of the first inverter section and a phase $\theta_2$ of the output phase voltage of the second inverter section changes depending on the percentage of modulation $\alpha$, wherein the threshold value $\alpha$th is $0<\alpha$th$<\sqrt{3}$.

2. The drive device according to claim 1, further comprising at least one of a first switch that opens and closes a part between the first high potential point and the second high potential point in a middle of first connection line and a second switch that opens and closes a part between the first low potential point and the second low potential point in the second connection line, wherein
    in a star connection drive region where the percentage of modulation $\alpha$ is $\alpha<\alpha 0$, the control section opens at least one of the first switch and the second switch, sets the second inverter as a neutral point of the windings of the rotary electric machine, drives the rotary electric machine by star connection control that changes the percentage of modulation $\alpha$ by the first inverter section,
    in an open connection drive region where the percentage of modulation $\alpha$ is $\alpha \leq \alpha 0$, the control section closes all the switches included in the drive device, and drives the rotary electric machine by open connection control in which a difference voltage between the output phase voltage of the first inverter section and the output phase voltage of the second inverter section is applied to the windings for the respective phases, and
    the $\alpha 0$ is $0<\alpha 0<4/\pi$.

3. The drive device according to claim 2, wherein in the star connection drive region, the control section sets the second inverter section as a neutral point of the windings of the rotary electric machine, and applies PWM control or overmodulation PWM control to the first inverter section to drive the rotary electric machine.

4. The drive device according to claim 2, wherein the threshold value $\alpha$th is $\alpha 0<\alpha$th$<\sqrt{3}$.

5. The drive device according to claim 1, wherein if the percentage modulation $\alpha$ is $\alpha<\alpha$th, the control section applies PWM control or overmodulation PWM control to at least one of the first inverter section and the second inverter section to drive the rotary electric machine.

* * * * *